United States Patent
Motoyama

(10) Patent No.: US 9,244,375 B2
(45) Date of Patent: Jan. 26, 2016

(54) IMAGE FORMING APPARATUS

(71) Applicant: CANON KABUSHIKI KAISHA, Tokyo (JP)

(72) Inventor: Hajime Motoyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/711,585

(22) Filed: May 13, 2015

(65) Prior Publication Data

US 2015/0331352 A1    Nov. 19, 2015

(30) Foreign Application Priority Data

May 16, 2014    (JP) ................. 2014-102482

(51) Int. Cl.
*G03G 15/043* (2006.01)
*G02B 26/12* (2006.01)

(52) U.S. Cl.
CPC ............ *G03G 15/043* (2013.01); *G02B 26/121* (2013.01)

(58) Field of Classification Search
CPC .......................... G03G 15/043; G02B 26/121
See application file for complete search history.

(56) References Cited

U.S. PATENT DOCUMENTS

2004/0188717 A1*   9/2004   Ono ................ H01S 5/042
                                              257/200

FOREIGN PATENT DOCUMENTS

JP        07-167613 A        7/1995

* cited by examiner

*Primary Examiner* — G. M. Hyder
(74) *Attorney, Agent, or Firm* — Canon USA, Inc. IP Division

(57) ABSTRACT

A bias circuit sets a value of a bias current using a correction coefficient α=0.5 for a predetermined time period from when a state in which a first capacitor and a second capacitor are not charged, then changes the correction coefficient to α=0.9 which is larger than α=0.5, and sets a value of the bias current obtained by using the correction coefficient α=0.9. The constant current source supplies the light emitting element with the bias current obtained by using the correction coefficient α=0.9 and supplies the bias current with a switching current, and thus an electrostatic latent image is formed.

13 Claims, 14 Drawing Sheets

IMAGE FORMING APPARATUS

BACKGROUND OF THE INVENTION

1. Field of the Invention

The present invention relates to bias current control in an electrophotographic type image forming apparatus.

2. Description of the Related Art

Recently, image forming apparatuses, which use a laser scanning optical system in an exposure apparatus, have used a vertical cavity surface emitting laser (VCSEL) as a light source of the exposure apparatus to improve productivity and resolution thereof. In the VCSEL, it is difficult to extract rear light, and thus light amount control is generally executed using front light. For example, a beam splitter is used for the light amount control. A part of the front light of the VCSEL is reflected by the beam splitter, and a photodiode detects a light amount thereof. In the case of the light amount control using the beam splitter, the light amount to be detected by the photodiode is reduced by lowering reflectance of the beam splitter so that an adequate light amount is secured for exposure. If the light amount detected by the photodiode is small, an effect of a dark current of the photodiode cannot be ignored and will be an error with respect to a detected signal.

Thus, a dark current cancelling unit is required to remove an error caused by a dark current. For example, Japanese Patent Application Laid-Open No. 07-167613 discusses a configuration in which a differentiating circuit removes a voltage corresponding to a dark current generated in a position detection element.

However, the dark current cancelling unit may sometimes affect settings of a bias current of the VCSEL. To a laser light source, the bias current is applied to increase a switching speed of the laser light source. In addition, automatic light amount control (APC) (hereinbelow, referred to as bias APC) is executed to obtain a threshold current value for setting the bias current. FIG. 14A is a graph illustrating an operation of the bias APC. As illustrated in FIG. 14A, an intersection point of a straight broken line obtained by executing the automatic light amount control with an X axis is obtained as a threshold current value Ith. Laser oscillation is started near the threshold current value Ith, and a minute amount of a laser beam is output. Generally, the threshold current value is scarcely affected by the minute light amount. However, the minute light amount may sometimes affect the threshold current value if the dark current cancelling unit is used. For example, when a dark current cancelling circuit as illustrated in FIG. 13A is used, the threshold current value Ith is obtained as a threshold current value Ith' due to Poffset which is influence of the minute light amount as illustrated in FIG. 14B. In the case in FIG. 14B, the obtained threshold current value Ith' is larger than an actual threshold current value Ith, and the minute light amount further increases.

When an APC sequence before image formation (hereinbelow, an initial APC sequence) is executed, a capacitor is charged from 0 V (a ground voltage: GND). Thus, in an early stage of the initial APC sequence, a voltage of the capacitor is not stable, and it is difficult to secure accuracy of the threshold current value. In such a circumstance, there is an issue that when a correction coefficient $\alpha$ multiplied by a threshold current is set to a value $\alpha$ at the time of image formation, a value of a bias current Ith' exceeds a true threshold current value Ith as illustrated in FIG. 14B, a value of the bias current cannot be accurately set.

The present invention is directed to restraining deterioration of setting accuracy of a bias current value in consideration of the above-described issue.

SUMMARY OF THE INVENTION

According to an aspect of the present invention, an image forming apparatus includes a light source including a light emitting element which emits a light beam for forming an electrostatic latent image on a photosensitive member, a rotating polygon mirror configured to be rotationally driven and to deflect a light beam emitted from the light source to scan the photosensitive member, a light receiving element for receiving a light beam emitted from the light emitting element, a current supply unit configured to supply a current to the light emitting element, wherein the current supply unit supplies the light emitting element with a bias current regardless of image data and supplies the light emitting element with a switching current to be superimposed on the bias current based on the image data for a time period in which at least the light beam scans the photosensitive member, a removal unit configured to remove a dark current component from a light receiving result of the light receiving element, wherein the dark current component is output from the light receiving element in a state in which the switching current is not supplied from the current supply unit to the light emitting element, an output unit configured to output a first comparison voltage corresponding to a first target light amount and a second comparison voltage corresponding to a second light amount larger than the first target light amount, a charging/discharging unit including a first capacitor and a second capacitor and configured to charge or discharge the first capacitor based on a comparison result of a voltage obtained by removing the dark current component from an output of the light receiving element which receives the light beam with the first comparison voltage and to charge or discharge the second capacitor based on a comparison result of a voltage obtained by removing the dark current component from an output of the light receiving element which receives the light beam with the second comparison voltage, and a bias current control unit configured to calculate a threshold current value based on voltage values of the first capacitor and the second capacitor and to set a value obtained by multiplying the threshold current value by a correction coefficient equal to or less than one to a value of the bias current, wherein the bias current control unit sets a value of the bias current using a first correction coefficient as the correction coefficient for a predetermined time period from when a state in which the first capacitor and the second capacitor are not charged, then changes the correction coefficient to a second correction coefficient larger than the first correction coefficient, and sets a value of a bias current obtained by using the second correction coefficient, and wherein the current supply unit supplies the light emitting element with a bias current obtained by using the second correction coefficient and the switching current, and thus the electrostatic latent image is formed.

Further features of the present invention will become apparent from the following description of exemplary embodiments with reference to the attached drawings.

DESCRIPTION OF THE EMBODIMENTS

Figure 1:
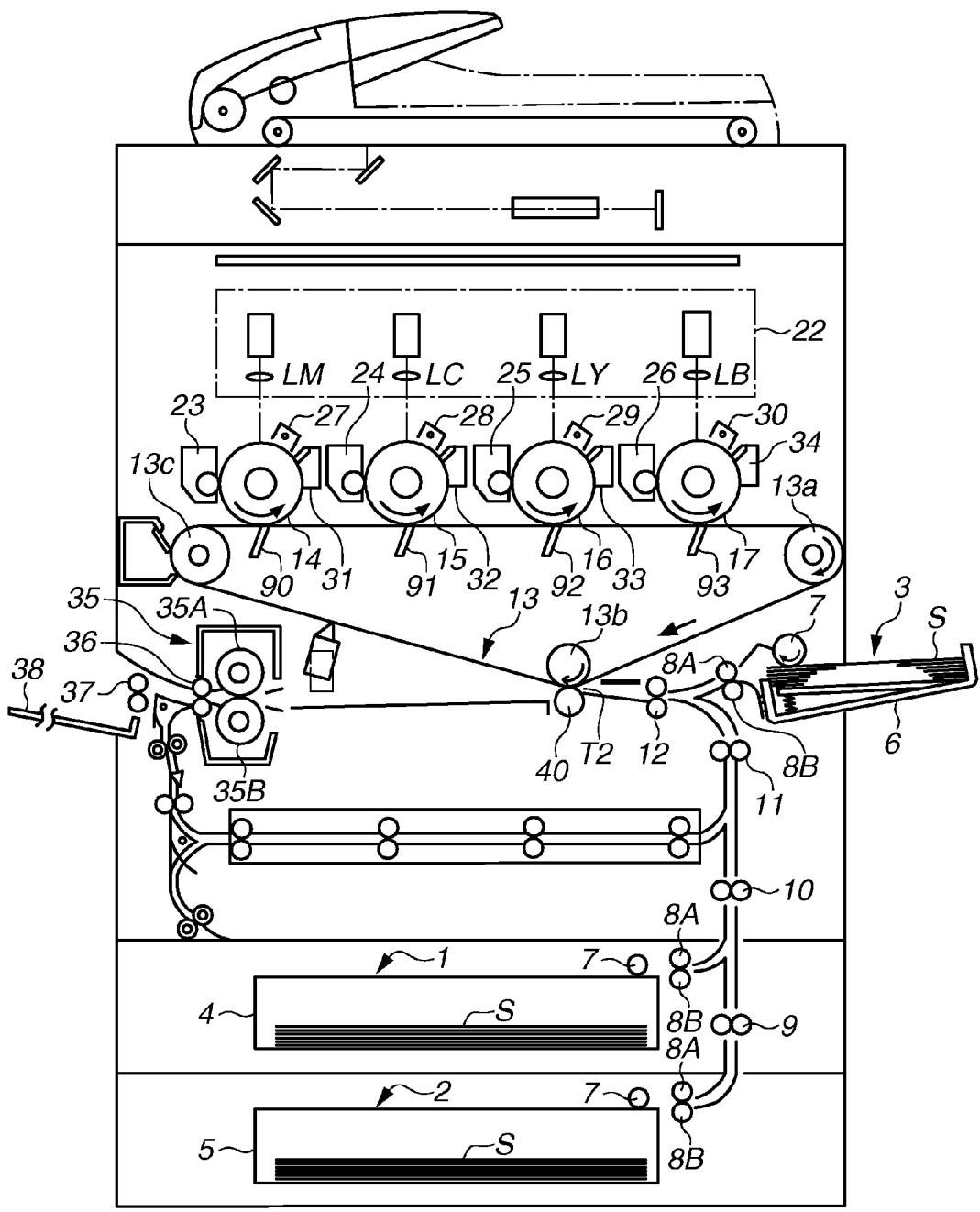
FIG. 1 illustrates a configuration of an image forming apparatus according to an exemplary embodiment.

Various exemplary embodiments, features, and aspects of the invention will be described in detail below with reference to the drawings. First, an effect of current value control by a dark current cancelling unit on execution of automatic light amount control (i.e., bias APC) for setting a bias current value is described in detail for comparison with an exemplary embodiment described below.

[Dark Current]

In an image forming apparatus, which uses a laser scanning optical system in an exposure apparatus, a multi-beam laser is increasingly used as a light source in order to improve productivity and resolution thereof. For example, when it is defined that:

PS: a moving speed (a process speed) of a laser beam on a surface of a photosensitive member in a scanning direction and an approximately vertical direction;

DPI: resolution;

RMS: the number of rotations of a rotating polygon mirror;

N: the number of surfaces of the rotating polygon mirror; and

M: the number of laser beams of a light source, a relationship among these values are expressed by the following formula.

PS=(RMS/60)*(25.4/DPI)*(N*M)

It can be understood from the formula that improvement of the productivity and the resolution can be achieved by increasing the number of rotations and the number of surfaces of the rotating polygon mirror, and the number of laser beams of the light source. However, in recent years, it has become difficult to increase the number of rotations of the rotating polygon mirror since the number of rotations of the rotating polygon mirror approaches 40,000 to 50,000 RPM which is a limit, and issues, such as temperature rise and noise generation, become pronounced. If the number of mirror surfaces are increased with an outer diameter of the rotating polygon mirror maintained constant, an optical characteristic thereof is generally deteriorated and a spot diameter of the light beam is enlarged which deteriorate an image quality. Therefore, increasing the number of surfaces of the rotating polygon mirror conflicts with an aim of improving the resolution. Further, if the number of mirror surfaces of the rotating polygon mirror are increased with a spot diameter of the light beam maintained constant, since a length of a side of the mirror needs to be maintained constant, the outer diameter of the rotating polygon mirror is enlarged which causes further temperature rise and noise generation.

On the other hand, a vertical cavity surface emitting laser diode has been discussed instead of a conventional edge emitting laser diode (EELD) as the exposure apparatus of the image forming apparatus. The vertical cavity surface emitting laser is referred to as the VCSEL in below. The VCSEL emits a laser beam from a surface of a wafer and thus can two-dimensionally arrange light emitting points as compared to the EELD which emits a laser beam from an end face of a wafer. Thus, the VCSEL has an advantage that the VCSEL can easily handle increase of the number of laser beams. The EELD can perform light amount control in such a manner that rear light is detected by a photodiode, and a drive current of the EELD is controlled based on the light amount detected by the photodiode. On the other hand, it is difficult for the VCSEL to extract the rear light. Thus, the VCSEL uses the front light in the light amount control. For example, the light amount control is executed in such a manner that a beam splitter separates a part of the front light of the VCSEL, and the photodiode detects a light amount thereof.

In addition, it is difficult for the VCSEL to extract a large light amount as compared to the EELD. Thus, when the beam splitter is used in the light amount control, the light amount to be detected by the photodiode is reduced by lowering reflectance of the beam splitter so as to secure an adequate light amount used for exposure. In this regard, an effect of a dark current is an issue of when the light amount to be detected by the photodiode is small. A dark current is a current flowing when light does not enter the photodiode and becomes an offset error with respect to a detection signal of the photodiode. This issue is generally avoided by using a range of the light amount in which the dark current does not affect the light amount control. However, if an output of the VCSEL is reflected by the beam splitter, a sufficient light amount cannot be obtained, and the effect of the dark current on the offset error cannot be ignored. Therefore, the dark current cancelling unit is required to remove an offset error due to a dark current component, in other words, to correct the dark current.

[Removal of Offset Error Due to Dark Current]

Figure 13A:
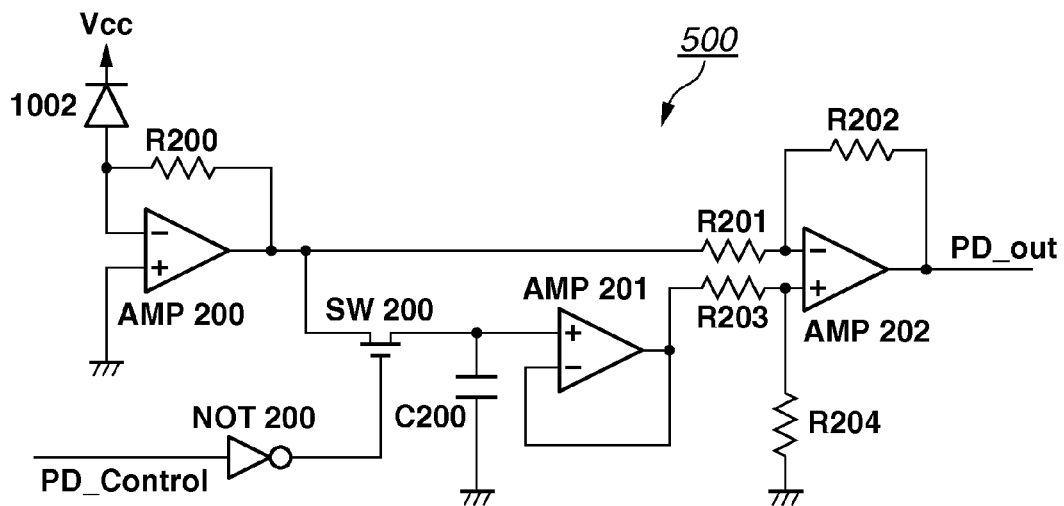
FIGS. 13A and 13B respectively illustrate a configuration of a photodiode (PD) unit and a dark current cancelling operation according to a conventional example.

FIG. 13A illustrates a configuration of a dark current cancelling circuit 500, which is a conventional dark current cancelling unit and in which an offset component of a dark current is subtracted by the subtraction circuit. A current/voltage conversion circuit includes an operational amplifier AMP 200 (hereinbelow, an operational amplifier is referred to as an AMP) and a resistor R200 and converts a current generated by a photodiode 1002 (hereinbelow, PD 1002) into a voltage signal. An output from the AMP 200 is input to a sample-and-hold circuit. The sample-and-hold circuit includes a switch SW 200 (hereinbelow, a switch is referred to as a SW), a capacitor C200, an AMP 201, and a negative circuit NOT 200 (hereinbelow, the NOT 200). The SW 200 includes a field-effect transistor (FET) and so on. The sample-and-hold circuit switches between a sample mode and a hold mode by an input PD_Control signal. The PD_Control signal is a signal output from a controller 1027 described below to the dark current cancelling circuit 500. The controller 1027 turns the SW 200 off via the NOT 200 by outputting a high level PD_Control signal, and thus the sample-and-hold circuit enters the hold mode. On the other hand, the controller 1027 turns the SW 200 on via the NOT 200 by outputting a low level PD_Control signal, and thus the sample-and-hold circuit enters the sample mode. Outputs of the AMP 201 and the AMP 200 are input to a differential amplifier circuit. The differential amplifier circuit includes an AMP 202, and resistors R201, R202, R203, and R204. The differential amplifier circuit outputs a detection signal PD_out of a laser beam amount.

Figure 13B:
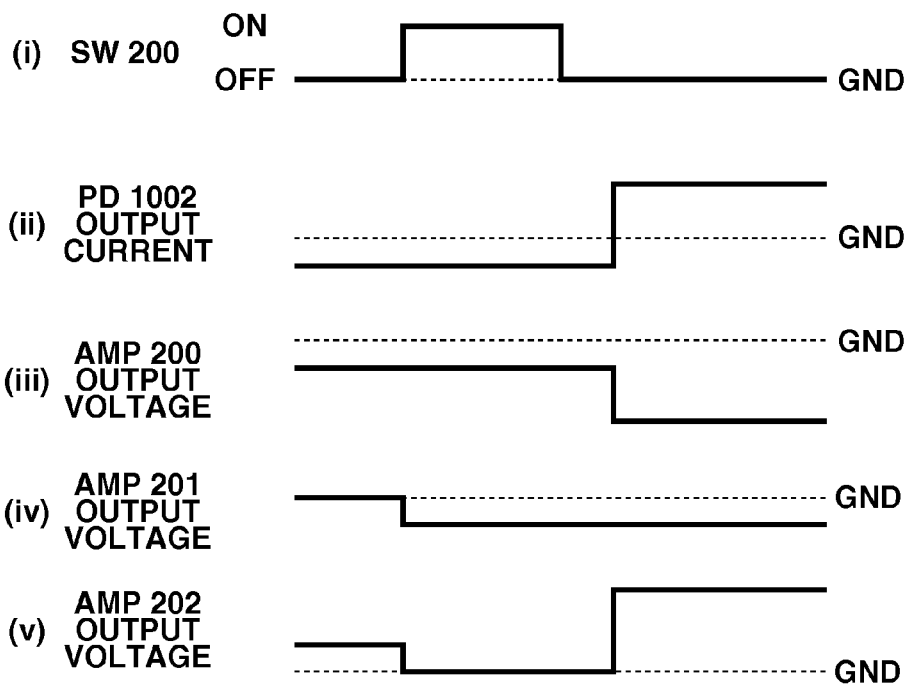

Operations to detect the laser beam amount are described with reference to FIG. 13B. FIG. 13B(i) illustrates ON and OFF of the SW 200. FIG. 13B(ii) illustrates a current (output current) generated by the PD 1002. FIG. 13B(iii) illustrates an output voltage of the AMP 200. FIG. 13B(iv) illustrates an output voltage of the AMP 201. FIG. 13B(v) illustrates an output voltage of the AMP 202. In the drawings, broken lines all represent a ground (GND), and abscissas all represent time. First, when the laser beam is not input to the PD 1002, as illustrated in FIG. 13B(ii), a dark current Idark is output from the PD 1002. Thus, as illustrated in FIG. 13B(iii), a voltage Voff output from the current/voltage conversion circuit, namely the AMP 200, is expressed as follows.

$$Voff = -Idark * R200$$

The sample-and-hold circuit is controlled to be the sample mode by the PD_Control signal, and the SW 200 is turned on. Thus, the capacitor C200 is charged to the voltage Voff.

Figure 2:
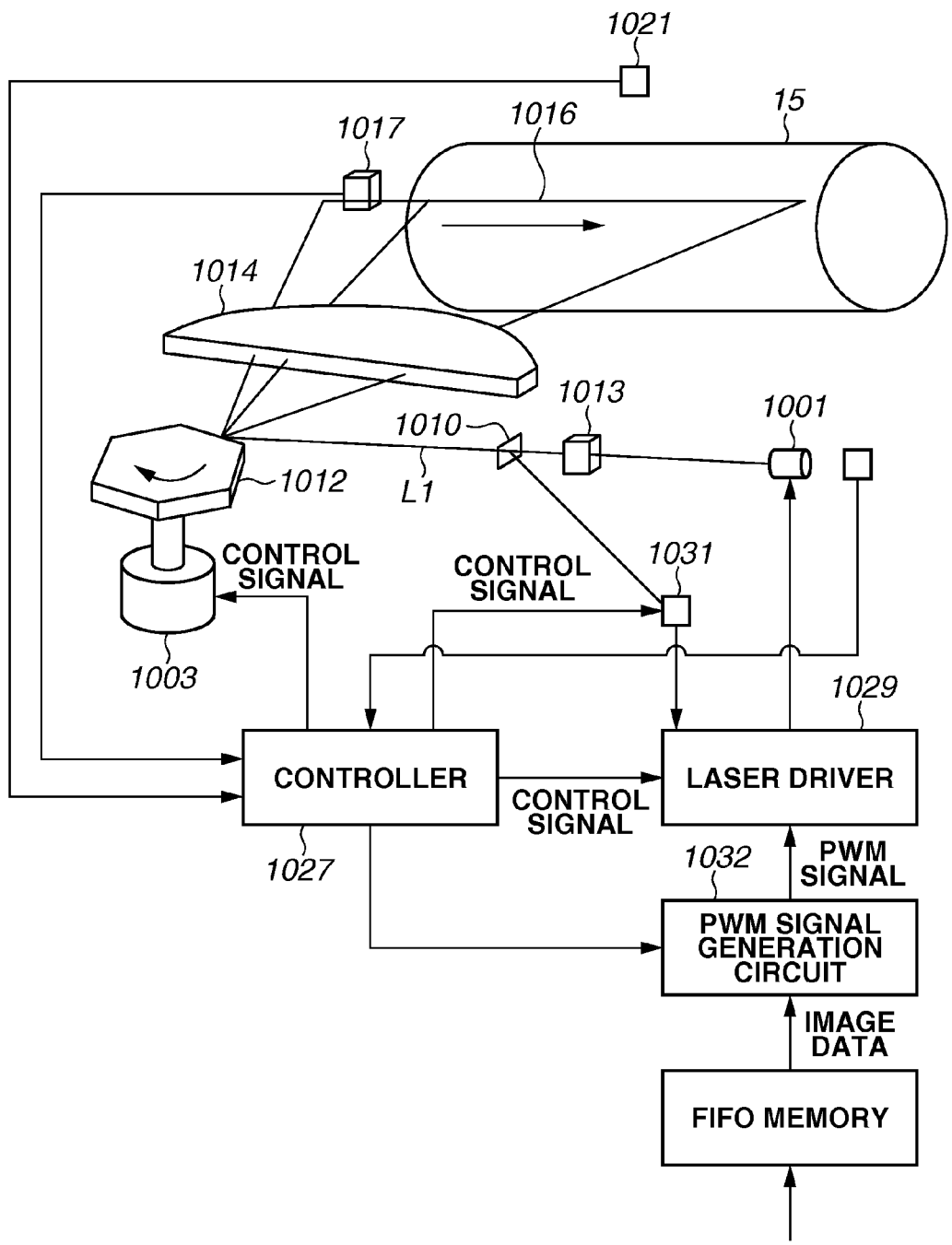
FIG. 2 illustrates a configuration of a semiconductor laser scanning optical system according to the exemplary embodiment.

The controller 1027 shifts the sample-and-hold circuit from the sample mode to the hold mode by the above-described PD_Control signal, and then causes a laser light source 1001, which is described below with reference to FIG. 2, to emit the laser beam. Next, when the laser beam is input to the PD 1002, the AMP 200 as the current/voltage conversion circuit outputs a current Ilight and the dark current Idark generated by the input laser beam. Thus, a voltage Von output from the current/voltage conversion circuit is expressed as follows.

$$Von = -(Ilight + Idark) * R200$$

The sample-and-hold circuit is controlled to be the hold mode by the PD_Control signal, and the SW 200 is turned off. The capacitor C200 holds the voltage Voff corresponding to the dark current Idark, and an output of the AMP 201 is the voltage Voff. Thus, the voltage Von which is an output of the AMP 200 is input to a negative input terminal of the AMP 202 in the differential amplifier circuit, and the voltage Voff which is an output of the AMP 201 is input to a positive input terminal of the AMP 202 in the differential amplifier circuit. At that time, the resistors R201, R202, R203, and R204 are preliminarily set to:

$$R201 = R202 = R203 = R204$$

Thus, a voltage Vpd output from the differential amplifier circuit is expressed as follows.

$$Vpd = Voff - Von$$

Further, the voltage Vpd is expressed as follows.

$$Vpd = -Idark*R200 + (Ilight + Idark)*R200 = Ilight*R200$$

Accordingly, it can be understood that a voltage (Vpd=PD_out) output from the differential amplifier circuit is not affected by the dark current Idark. As described above, the automatic light amount control (automatic power control; the APC) is executed using the voltage Vpd (=PD_out) output from the differential amplifier circuit, and thus the light amount control can be accurately executed in which an effect of the dark current is cancelled.

On the other hand, high-speed responsibility is required for a light source of the exposure apparatus in the image forming apparatus. When a switching frequency per one pixel of the laser light source is represented by F, a relationship is expressed by the following formula. The switching frequency is a frequency for an operation (switching operation) of turning the laser light source on and off.

$$F = 4*\pi*F\theta*(DPI/25.4)^2*PS/(N*M) \quad \text{formula (B)}$$

Fθ: an Fθ lens coefficient
PS: a moving speed (a process speed) of a laser beam on a surface of a photosensitive member in a scanning direction and an approximately vertical direction
DPI: resolution
N: the number of surfaces of a polygon mirror
M: the number of beams As can be understood from the formula (B), the switching frequency F of the laser light source is proportional to the square of the process speed PS and the resolution DPI. In other words, when the productivity and the resolution of the image forming apparatus are improved, the switching frequency F of the laser light source becomes higher.

On the other hand, a rise time and a fall time of when the laser light source is switched affect formation of an electrostatic latent image. A rise of a light amount refers to a shift of the laser light source from when being turned off to when emitting a predetermined light amount (for example, 90% of a target light amount), and a fall of the light amount refers to a shift of the laser light source from when emitting the predetermined light amount to when being turned off. When exposure is performed based on image data, if a rise time of when the laser light source is switched becomes longer, an electrostatic latent image is thinned, whereas if a fall time becomes longer, an electrostatic latent image is thickened. If the switching frequency F of the laser light source becomes higher, effects of the rise time and the fall time on an image quality becomes larger. In addition, in order to respond an increase in switching speed of a switching operation of the laser light source, when the laser light source is turned off, a bias current equal to or less than a threshold current value is applied thereto.

Figure 14A:
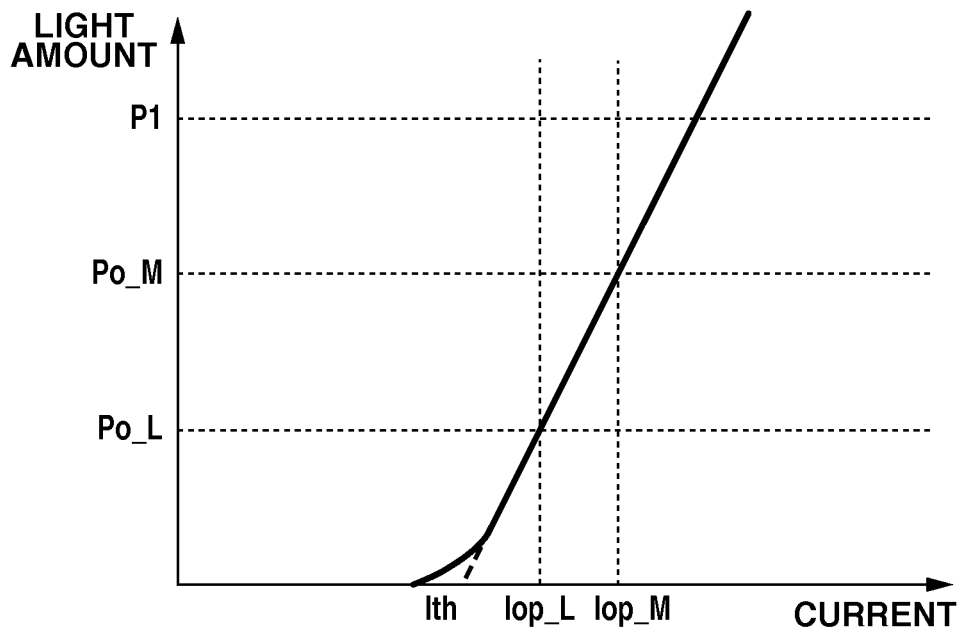
FIGS. 14A and 14B illustrate how to obtain a threshold current value according to a conventional example.

The threshold current value of the laser light source varies with temperature. Thus, bias automatic power control (namely, the bias APC) is executed to obtain a threshold current value for applying an optimum bias current. Operations of the bias APC are described with reference to FIG. 14A. In FIG. 14A, an abscissa represents a current flowing through the laser diode, and an ordinate represents an amount of light emitted from the laser diode. In other words, FIG. 14A indicates a current versus a light amount (I-L) characteristic of the laser diode. An operation sequence in one scanning of the exposure apparatus includes some modes. An L_APC mode and an M_APC mode in those modes are modes for executing the APC using a different light amount and sampling a current value at that time to determine the threshold current value. Here, a light amount and a current at the L_APC mode are respectively defined as Po_L and Iop_L, and a light amount and a current at the M_APC mode are respectively defined as Po_M and Iop_M. In this case, the threshold current value Ith is expressed as follows.

$$(Po\_M*Iop\_L - Po\_L*Iop\_M)/(Po\_M - Po\_L)$$

As illustrated in FIG. 14A, the threshold current value Ith is obtained as an intersection point of a straight broken line with the X axis.

A bias current Ib is set as a value obtained by multiplying the threshold current value Ith by a bias coefficient α which is a correction coefficient equal to or less than one, and determined as follows.

$$Ib = Ith*\alpha$$

α: a bias coefficient (equal to or less than one (α≤1))
The switching speed becomes faster as the bias coefficient α is closer to one. In other words, it is better to set the bias coefficient α to a value closer to one to increase the switching speed. As described above, the bias APC is executed to obtain the threshold current value Ith, and a current to be applied to the laser diode is controlled by determining the bias current Ib.

On the other hand, oscillation of the laser diode is started near the threshold current value Ith, and a minute amount of the laser beam is output. Hereinbelow, the relevant output is referred to as minute light emission and a light amount of the minute light emission is referred to as a minute light amount. Generally, a minute amount of the laser beam (hereinbelow, the minute light amount) near the threshold current value Ith has little effect on the bias APC. However, when the above-described dark current cancelling circuit 500 is used, the minute light amount may sometimes affect the bias APC. An effect of the dark current on the bias APC is described using the dark current cancelling circuit 500 illustrated in FIG. 13A.

First, when a current generated by the dark current Idark and minute laser emission (namely, the minute light amount) is defined as Ioffset, the voltage Voff output from the current/voltage conversion circuit (namely, the operational amplifier AMP 200) is expressed as follows.

$$V\text{off}=-(I\text{dark}+I\text{offset})*R200$$

Next, when normal laser emission is performed, the voltage Von output from the current/voltage conversion circuit is expressed as follows.

$$V\text{on}=-(I\text{light}+I\text{dark})*R200$$

The voltage Vpd output from the differential amplifier circuit is expressed as follows.

$$V\text{pd}=V\text{off}-V\text{on}$$

Further, it is expressed as follows.

$$V\text{pd}=-(I\text{dark}+I\text{offset})*R200+(I\text{light}+I\text{dark})*R200=(I\text{light}-I\text{offset})*R200$$

As described above, the voltage Vpd output from the differential amplifier circuit, namely the voltage PD_out output from the dark current cancelling circuit 500 has a lower value by the amount of the minute laser emission as compared to a case without the effect of the minute light amount. If the APC is executed in this state, the light amount of the laser diode is largely controlled by the amount of the minute laser emission, and there is a possibility that a light amount used in image formation cannot be set to an optimum state. Further, if the APC is executed in this state, an error is caused when the threshold current value Ith is obtained.

[Effect of Dark Current Cancelling Circuit]

Figure 14B:
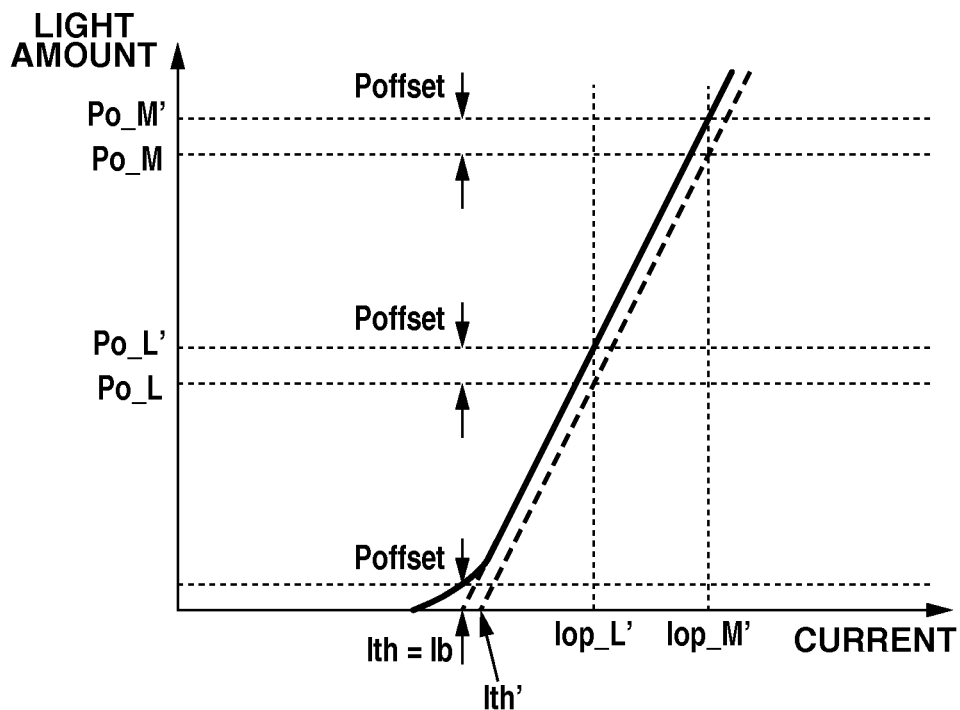

An effect of the minute light amount on the dark current cancelling circuit 500 is described with reference to FIG. 14B. FIG. 14B is a graph in which the abscissa represents a current and the ordinate represents a light amount as is the case with FIG. 14A. If the bias coefficient α is set to one (α=1) to increase the switching speed, the bias current Ib becomes equal to the threshold current value Ith (the bias current Ib=the threshold current value Ith). When a light amount of the minute light emission when the bias current Ib is applied to the laser diode is defined as Poffset, the light amount Poffset is held and becomes an error. First, when the bias APC is executed at the light amount Po_M, an actual light amount emitted from the laser diode is affected by the light amount Poffset, which is an offset of the minute light emission, and expressed as follows.

$$Po\_M'=Po\_M+P\text{offset}$$

Thus, a current value Iop_M' at that time is held. Next, when the bias APC is executed at the light amount Po_L, an actual light amount emitted from the laser diode is affected by the light amount Poffset, which is an offset of the minute light emission, and expressed as follows.

$$Po\_L'=Po\_L+P\text{offset}$$

Thus, a current value Iop_L' at that time is held.

A threshold current Ith' calculated from these held current values Iop_M' and Iop_L' is expressed as $$(Po\_M*Iop\_L'-Po\_L*Iop\_M')/(Po\_M-Po\_L)$$

In this case, $$Ith'>Ith$$

is satisfied, and the calculated threshold current value Ith' becomes larger than the actual threshold current value Ith. Accordingly, the minute light amount will be even larger.

In addition, operations may be unstable at the start of the APC sequence. For example, when the sample-and-hold circuit using a capacitor is used for circuits to hold the current values Iop_M and Iop_L, once the APC sequence becomes stable, the capacitor is charged and discharged by an amount of an error. However, at the start of the APC sequence, the capacitor needs to be charged to a stable voltage. If the capacitor is not charged to the stable voltage, a calculation value of a threshold voltage value corresponding to the threshold current value may greatly vary in some cases. If the threshold voltage value is calculated larger than an actual threshold voltage value, the minute light emission due to the bias current cannot be ignored and amplifies an error of the APC as a voltage error output from the dark current cancelling circuit 500, and the light amount could be finally a maximum value. Thus, there is a possibility that a malfunction may occur in the dark current cancelling circuit 500.

[Image Forming Apparatus]

FIG. 1 illustrates a configuration of an image forming apparatus for forming a color image according to an exemplary embodiment. A basis of image formation is described below with reference to FIG. 1. The color image forming apparatus includes two cassette sheet feeding units and 2 and one manual sheet feeding unit 3. Transfer paper S, which is a recording medium, is selectively fed from the cassette sheet feeding units 1 and 2 or the manual sheet feeding unit 3 (hereinbelow, simply referred to as each of the sheet feeding units 1, 2, and 3). Sheets of the transfer paper S are stacked on cassettes 4 and 5, and a tray 6 in each of the sheet feeding units 1, 2, and 3, and picked up by the pickup roller 7 from an uppermost transfer paper one by one toward a conveyance path. From the transfer paper S sheets picked up by the pickup roller 7, only the uppermost transfer paper is separated by a separating roller pair including a feeding roller 8A serving as a conveyance unit and a retard roller 8B serving as a separation unit. Then, the transfer paper S is conveyed to a registration roller pair 12 which stops rotation. In this case, the transfer paper S fed from the cassette 4 or 5, of which distance to the registration roller pair 12 is long, is relayed by a plurality of conveyance roller pairs 9, 10, and 11 and conveyed to the registration roller pair 12. The transfer paper S conveyed to the registration roller pair 12 hits against a nip portion of the registration roller pair 12 by its leading edge and forms a predetermined loop, and the movement of the transfer paper S is once stopped. Forming the loop corrects a skew feeding of the transfer paper S.

On a downstream of the registration roller pair in a conveyance direction of the transfer paper S (hereinbelow, simply referred to as the downstream), a long intermediate transfer belt 13 serving as an intermediate transfer member is disposed. The intermediate transfer belt 13 is suspended on a drive roller 13a, a secondary transfer counter roller 13b, and a tension roller 13c and is set to an approximately triangle shape in a cross sectional view. The intermediate transfer belt 13 rotates in a clockwise direction in the drawing. On an upper surface of a horizontal portion of the intermediate transfer belt 13, photosensitive drums 14, 15, 16, and 17 which are a plurality of photosensitive members respectively forming and bearing different color toner images are serially arranged in a rotation direction of the intermediate transfer belt 13. The photosensitive drum 14 on the most upstream side in the rotation direction of the intermediate transfer belt 13 bears a magenta (M) color toner image. Next photosensitive drum 15 bears a cyan (C) color toner image. Further next photosensitive drum 16 bears yellow (Y) color toner image. Then, the photosensitive drum 17 on the most downstream side in the rotation direction of the intermediate transfer belt 13 bears a black (B) color toner image.

First, exposure to a laser beam (also a light beam) LM based on a magenta component image is started on the photosensitive drum 14 (on the photosensitive member) on the most upstream side of the intermediate transfer belt 13, and an electrostatic latent image is formed on the photosensitive drum 14. The electrostatic latent image formed on the photosensitive drum 14 is visualized by a magenta toner supplied from a development device 23. Next, after the elapse of a predetermined time period from the start of the exposure to the laser beam LM of the photosensitive drum 14, exposure to a laser beam LC based on a cyan component image is started on the photosensitive drum 15, and an electrostatic latent image is formed on the photosensitive drum 15. The electrostatic latent image formed on the photosensitive drum 15 is visualized by a cyan toner supplied from a development device 24. Next, after the elapse of a predetermined time period from the start of the exposure to the laser beam LC of the photosensitive drum 15, exposure to a laser beam LY based on a yellow component image is started on the photosensitive drum 16, and an electrostatic latent image is formed on the photosensitive drum 16. The electrostatic latent image formed on the photosensitive drum 16 is visualized by a yellow toner supplied from a development device 25. Next, after the elapse of a predetermined time period from the start of the exposure to the laser beam LY of the photosensitive drum 16, exposure to a laser beam LB based on a black component image is started on the photosensitive drum 17, and an electrostatic latent image is formed on the photosensitive drum 17. The electrostatic latent image formed on the photosensitive drum 17 is visualized by a black toner supplied from a development device 26. Primary charging devices 27, 28, 29, and 30 are disposed around the respective photosensitive drums 14 to 17 to uniformly charge the photosensitive drums 14 to 17. In addition, cleaners 31, 32, 33, and 34 are respectively disposed to remove toners attached to the photosensitive drum 14 to 17 after transfer of the toner images.

During a process that the intermediate transfer belt 13 rotates in the clockwise direction, the intermediate transfer belt 13 passes through a transfer portion between the photosensitive drum 14 and a transfer charger 90, and thus the magenta toner image is transferred onto the intermediate transfer belt 13. Next, the intermediate transfer belt 13 passes through a transfer portion between the photosensitive drum 15 and a transfer charger 91, and thus the cyan toner image is transferred onto the intermediate transfer belt 13. Next, the intermediate transfer belt 13 passes through a transfer portion between the photosensitive drum 16 and a transfer charger 9, and thus the yellow toner image is transferred onto the intermediate transfer belt 13. Lastly, the intermediate transfer belt 13 passes through a transfer portion between the photosensitive drum 17 and a transfer charger 93, and thus the black toner image is transferred onto the intermediate transfer belt 13. Timing of transfer of the respective color toner images from the photosensitive drums 14 to 17 to the intermediate transfer belt 13 is adjusted so that the magenta, cyan, yellow, and black toner images are transferred onto the intermediate transfer belt 13 to overlap with each other.

In addition, the transfer paper S is conveyed to the registration roller pair 12, and a skew feeding thereof is corrected. The registration roller pair 12 starts rotation at a timing so as to match a position of the toner image on the intermediate transfer belt 13 with a leading edge of the transfer paper. Next, the transfer paper S is conveyed by the registration roller pair 12 to a transfer portion T2 which is an abutment portion between a secondary transfer roller 40 on the intermediate transfer belt 13 and the secondary transfer counter roller 13b, and the toner image is transferred onto a sheet surface. The transfer paper S passed through the transfer portion T2 is conveyed to a fixing apparatus 35 which is a fixing unit. Then, during a process that the transfer paper S passes through a nip portion formed by a fixing roller 35A and a pressure roller 35B in the fixing apparatus 35, the transfer paper S is heated by the fixing roller 35A and pressured by the pressure roller 35B, so that the toner image is fixed to the sheet surface. The transfer paper S subjected to the fixing processing and passed through the fixing apparatus is conveyed by a conveyance roller pair 36 to a discharge roller pair 37 and discharged on a discharge tray on the outside of the apparatus. The color image forming apparatus illustrated in FIG. 1 is an example, another possible example is a monochromatic image forming apparatus. The configuration of the present exemplary embodiment is not limited thereto.

Further, the color image forming apparatus includes an exposure apparatus 22 (portion indicated by an alternate long and short dash line) corresponding to each of the photosensitive drums 14 to 17. The exposure apparatus 22 is an optical scanning apparatus irradiating the photosensitive drum 14 to 17 with the laser beams. The exposure apparatus 22 includes a configuration in which a plurality of beams can be emitted from a semiconductor laser used as a laser light source in response to speeding up and improvement of image quality in recent printers and copying machines. Accordingly, exposure can be performed on a plurality of lines in a single scanning by the rotating polygon mirror. Especially, a surface emitting laser (the VCSEL) is in practical use instead of an edge emitting laser, and multiplication of beams becomes easy.

[Exposure Apparatus]

An example to use a multi-beam semiconductor laser in the image forming apparatus is described below. FIG. 2 schematically illustrates a configuration of one exposure apparatus (corresponding cyan color) among four exposure apparatuses 22 used in FIG. 1. The electrophotographic type image forming apparatus, as illustrated in FIG. 2, includes an exposure unit which irradiates the photosensitive drum 15 with the laser beam to form a latent image corresponding to input image data on the photosensitive drum 15. The exposure unit according to the present exemplary embodiment includes a monolithic laser light source 1001 including 16 pieces of light emitting points (light emitting elements) LD1 to LD16 (hereinbelow, simply referred to as an LD) which emit the laser beams, in other words including a plurality of light emitting points. A plurality of laser beams emitted from the laser light source 1001 becomes parallel laser beams via a collimator lens 1013 and enters a beam splitter 1010. The beam splitter 1010 is disposed between the laser light source 1001 and a rotating polygon mirror 1012 on an optical path of the light beam emitted from the laser light source 1001. The beam splitter 1010 according to the present exemplary embodiment reflects approximately 1% of a light amount of a laser beam and transmits approximately 99% of the light amount of the laser beam based on the light amount of the laser beam entering the beam splitter 1010 as 100%. The laser beam reflected by the beam splitter 1010 enters the photodiode 1002 (hereinbelow, PD 1002) of a PD unit 1031 which is a light receiving element (a photoelectric conversion element). The PD 1002 outputs a detection current, which is a light receiving result, having a value corresponding to the light amount of the entered laser beam.

99% of the light amount of the laser beam L1 which transmitted the beam splitter 1010 enters a reflection surface of the rotating polygon mirror 1012 which is a deflection unit rotationally driven by a scanner motor 1003. The rotating polygon mirror 1012 reflects the laser beam L1 entered the reflection surface to scan the photosensitive drum 15. The laser beam L1 reflected by the rotating polygon mirror 1012 passes through an F θ lens 1014 and scans the photosensitive drum 15 in a main scanning direction (an arrow direction in the drawing) at a constant speed. An electrostatic latent image 1016 is formed on the photosensitive drum 15 by the scanning of the laser beam L1. The laser beam L1 reflected by the rotating polygon mirror 1012 enters a beam detector 1017 (hereinbelow, the BD 1017). The BD 1017 outputs a BD signal in response to reception of the laser beam L1.

The BD signal output from the BD 1017 is input to the controller 1027. The controller 1027 transmits a writing position signal to a PWM signal generation circuit 1032 based on the BD signal input from the BD 1017. Multi-value image data (density data) is input to the PWM signal generation circuit 1032. The PWM signal generation circuit 1032 converts the multi-value image data to binary image data (bit data) corresponding to each of the LD1 to the LD16. The PWM signal generation circuit 1032 outputs the bit data in synchronization with a clock signal and thus outputs a PWM signal to be input to a laser driver 1029. The PWM signal generation circuit 1032 controls an output timing of first pixel data in the main scanning direction synchronized with the clock signal based on the BD signal.

The controller 1027 outputs to the laser driver 1029 a switch control signal serving as a control signal for controlling on and off of various switches, which is described below, provided to the laser driver 1029.

A density sensor 1021 is a sensor for detecting density of an image on the surface of the photosensitive drum 15 after the electrostatic latent image is developed, and outputs a detection result to the controller 1027. The controller 1027 outputs a gain control signal serving as a control signal to an APC circuit provided to the laser driver 1029, which is described below, based on information about the image density input from the density sensor 1021. The controller 1027 outputs the gain control signal so as to control the light amount of the laser beam emitted based on the image data to be a target light amount. According to the present exemplary embodiment, the number of the light emitting points is not limited to 16 and may be N points (N is a natural number).

[Operation of Exposure Apparatus]

Figure 3A:
FIGS. 3A to 3C respectively illustrate a sequence of an exposure apparatus according to the exemplary embodiment, a bias APC, and a correction operation.

A configuration of the laser driver 1029 is described. To simplify the description, the number of the LDs is reduced, and an exemplary embodiment of which configuration includes two LDs is described. FIGS. 3A(i) and 3A(ii) are operation sequences of one scanning by the exposure apparatus 22 illustrated in FIG. 2. FIG. 3A(i) illustrates a waveform of a BD signal output from the BD 1017. FIG. 3A(ii) illustrates operation modes of the exposure apparatus 22. Abscissas in these drawings represent time. The operation modes of the exposure apparatus 22 include an APC mode, an OFF mode, and a VIDEO mode. The APC mode includes an L_APC mode as a first light amount control mode, an M_APC mode as a second light amount control mode, and an H_APC mode as a third light amount control mode. In other words, the operation modes of the exposure apparatus 22 include five modes, namely the OFF mode, the VIDEO mode, the L_APC mode, the M_APC mode, and the H_APC mode of the APC mode. In these modes, the M_APC mode and the L_APC mode are modes for determining respective threshold current values by executing the APC using individually different light amounts and sampling current values at the relevant light amounts. In other words, the M_APC mode and the L_APC mode are modes for executing the bias APC to determine a bias current Ibias. The H_APC mode is the APC mode for controlling a light amount used for exposure of the photosensitive drum to the target light amount. The OFF mode is a mode for bringing a light emitting point into an unlit state and also holding the current value sampled in each APC mode. The VIDEO mode is a mode for performing exposure of the photosensitive drum 15 based on a PWM signal for inputting a laser.

Figure 4:
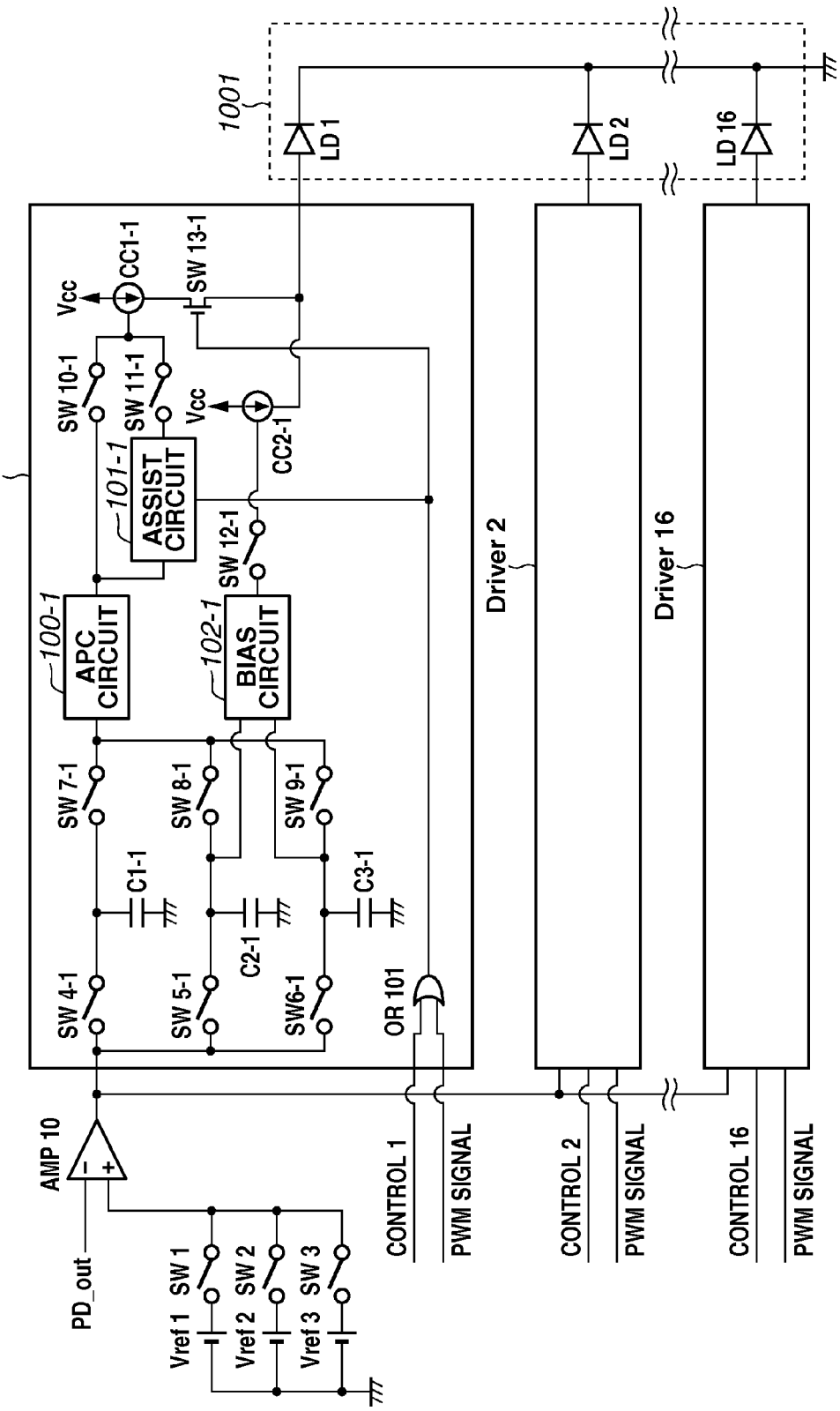
FIG. 4 illustrates a laser drive circuit according to the exemplary embodiment.
Figure 5:
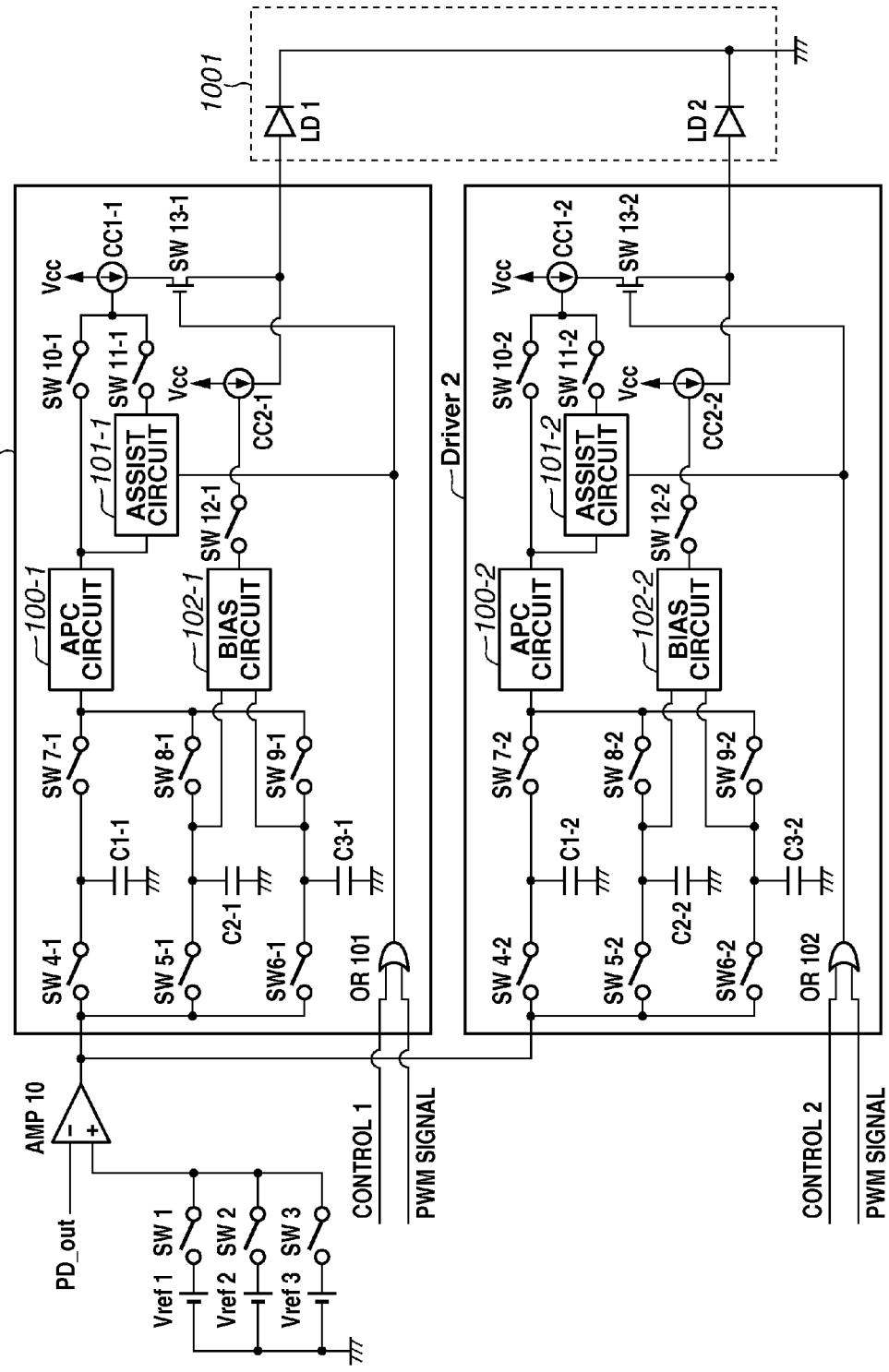
FIG. 5 illustrates laser drive circuits of light emitting points LD1 and LD2 according to the exemplary embodiment.

Next, operations of each mode are described. FIG. 4 illustrates a circuit of the laser driver 1029 illustrated in FIG. 2. In FIG. 4, the circuit of the laser driver 1029 includes 16 light emitting points. FIG. 5 illustrates a circuit of which configuration includes two light emitting point. A driving unit of the LD1 is a Driver 1. A driving unit of the LD2 is a Driver 2. According to the present exemplary embodiment, the Driver 1 and the Driver 2 forms one integrated circuit (IC).

The controller 1027 outputs a control signal for switching a control mode of the Driver 1 or the Driver 2 to an OR circuit 101 or an OR circuit 102 of the laser driver 1029 at various timings based on the BD signal. For example, in the case of the laser driver 1029 illustrated in FIG. 5, the controller 1027 respectively outputs a control signal CONTROL 1 and a control signal CONTROL 2 (hereinbelow, simply referred to as a CONTROL) shown in Table 1 to the OR circuit 101 and the OR circuit 102 to switch the control mode. The CONTROL 1 and the CONTROL 2 are generated from data0, data1, and data2 shown in Table 1.

TABLE 1

| Control mode | data0 | data1 | data2 | CONTROL1 | CONTROL2 | PWM | SW13-1 | SW13-2 |
|---|---|---|---|---|---|---|---|---|
| APC_H_LD1 | 1 | 1 | 1 | High | Low | Low | ON | OFF |
| APC_M_LD1 | 1 | 1 | 0 | High | Low | Low | ON | OFF |
| APC_L_LD1 | 1 | 0 | 0 | High | Low | Low | ON | OFF |
| APC_H_LD2 | 0 | 0 | 1 | Low | High | Low | OFF | ON |
| APC_M_LD2 | 0 | 1 | 1 | Low | High | Low | OFF | ON |
| APC_L_LD2 | 0 | 1 | 0 | Low | High | Low | OFF | ON |

TABLE 1-continued

| Control mode | data0 | data1 | data2 | CONTROL1 | CONTROL2 | PWM | SW13-1 | SW13-2 |
|---|---|---|---|---|---|---|---|---|
| VIDEO | 1 | 0 | 1 | Low | Low | High/Low | ON/OFF by PWM signal | ON/OFF by PWM signal |
| OFF | 0 | 0 | 0 | Low | Low | Low | OFF | OFF |

As shown in Table 1, in the H_APC mode, the M_APC mode, and the L_APC mode of the LD1, the controller 1027 outputs a high level CONTROL 1 and a low level CONTROL 2. A low level PWM signal is input to the OR circuit 101 and the OR circuit 102. Thus, a switch SW 13-1 described below is turned on, and the LD1 comes into a state ready to execute the H_APC mode, the M_APC mode, and the L_APC mode. On the other hand, in the H_APC mode, the M_APC mode, and the L_APC mode of the LD2, the controller 1027 outputs a low level CONTROL 1 and a high level CONTROL 2. A low level PWM signal is input to the OR circuit 101 and the OR circuit 102. Thus, a switch SW 13-2 described below is turned on, and the LD2 comes into a state ready to execute the H_APC mode, the M_APC mode, and the L_APC mode.

A configuration of the PD unit 1031 includes the dark current cancelling circuit 500 illustrated in FIG. 13A, and the PD 1002 of the PD unit 1031 is a photoelectric conversion element outputting a current having a value corresponding to the entered light amount. The PD 1002 is connected to a negative input terminal of an error amplifier AMP 10 via the dark current cancelling circuit 500. In other words, to the negative input terminal of the error amplifier AMP 10 (hereinbelow, simply referred to as the AMP 10), a detection signal PD_out (Vpd) of a laser beam amount output from the dark current cancelling circuit 500 of the PD unit 1031 is input.

On the other hand, a positive input terminal of the AMP 10 is connected to a switch SW 1, a switch SW 2, and a switch SW 3. The switch SW 1 is connected to a reference voltage Vref1, the switch SW 2 is connected to a reference voltage Vref2, and the switch SW 3 is connected to a the reference voltage Vref3.

The controller 1027 transmits to the laser driver 1029 a control signal for shifting either one of the Driver 1 and the Driver 2 to the third light amount control mode. When either one of the Driver 1 and the Driver 2 is in the third light amount control mode, the switch SW 1 is turned on, and the switches SW 2 and SW 3 are turned off. When the switch SW 1 is turned on, and the switches SW 2 and SW 3 are turned off, the reference voltage Vref1 is applied to the positive input terminal of the AMP 10. The AMP 10 compares the voltage Vpd of the negative input terminal with the reference voltage Vref1 of the positive input terminal. In other words, the reference voltage Vref1 is compared by the AMP 10 with the voltage Vpd in the third light amount control mode of either one of the Driver 1 and the Driver 2.

The controller 1027 transmits to the laser driver 1029 a control signal for shifting either one of the Driver 1 and the Driver 2 to the second light amount control mode. When either one of the Driver 1 and the Driver 2 is in the second light amount control mode, the switch SW 2 is turned on, and the switches SW 1 and SW 3 are turned off. When the switch SW 2 is turned on, and the switches SW 1 and SW 3 are turned off, the reference voltage Vref2 is applied to the positive input terminal of the AMP 10. The AMP 10 compares the voltage Vpd of the negative input terminal with the reference voltage Vref2 of the positive input terminal. In other words, the reference voltage Vref2 is compared by the AMP 10 with the voltage Vpd in the second light amount control mode of either one of the Driver 1 and the Driver 2.

The controller 1027 transmits to the laser driver 1029 a control signal for shifting either one of the Driver 1 and the Driver 2 to the first light amount control mode. When either one of the Driver 1 and the Driver 2 is in the first light amount control mode, the switch SW 3 is turned on, and the switches SW 1 and SW 2 are turned off. When the switch SW 3 is turned on, and the switches SW 1 and SW 2 are turned off, the reference voltage Vref3 is applied to the positive input terminal of the AMP 10. The AMP 10 compares the voltage Vpd of the negative input terminal with the reference voltage Vref3 of the positive input terminal. In other words, the reference voltage Vref3 is compared by the AMP 10 with the voltage Vpd in the first light amount control mode of either one of the Driver 1 and the Driver 2.

The reference voltages Vref1, Vref2, and Vref3 respectively correspond to target light amounts of light amounts entering the PD 1002 in the third light amount control mode, the second light amount control mode, and the first light amount control mode. It is known that the beam splitter 1010 separates 1% of a light amount at the time of designing. Thus, controlling a light amount of a laser beam entering the PD 1002 to the target light amount corresponds to controlling a light amount of a laser beam emitted from the laser light source 1001 to the target light amount. Regarding the reference voltage, the following relationship is satisfied, that is the reference voltage Vref1 (a third comparison voltage corresponding to a third target light amount)<the reference voltage Vref2 (a second comparison voltage corresponding to a second target light amount)≤the reference voltage Vref3 (a first comparison voltage corresponding to a first target light amount). An output of the AMP 10 is input to the Driver 1 and the Driver 2. The third target light amount corresponding to the third comparison voltage Vref1 is equal to or larger than the second target light amount corresponding to the second comparison voltage Vref2.

Next, an internal configuration of the Driver 1 and the Driver 2 is described. The Driver 1 and the Driver 2 have the same configuration, and thus the configuration of the Driver 1 is described as a representative thereof. The output of the AMP 10 input to the Driver 1 is input to one end of each of a switch SW 4-1, a switch SW 5-1, and a switch SW 6-1, and other ends of the switches SW 4-1, SW 5-1, and SW 6-1 are respectively connected to capacitors C1-1, C2-1, and C3-1. The switch SW 4-1 and the capacitor C1-1 as a third capacitor, the switch SW 5-1 and the capacitor C2-1 as a second capacitor, and the switch SW 6-1 and the capacitor C3-1 as a first capacitor each form a sample-and-hold circuit. The capacitors C1-1, C2-1, and C3-1 each sample the output voltage of the AMP 10 when the respective switches SW 4-1, SW 5-1, and SW 6-1 are turned on based on the control signal from the controller 1027. Further, the capacitors C1-1, C2-1, and C3-1 each performs an operation to hold the output voltage of the AMP 10 when the respective switches SW 4-1, SW 5-1, and SW 6-1 are turned off.

The voltage held by the capacitors C1-1, C2-1, and C3-1 are output via respective switches SW 7-1, SW 8-1, and SW 9-1 to an APC circuit 100-1 serving as a switching current control unit. The APC circuit 100-1 controls an output voltage based on the voltage input from the sample-and-hold circuit to control the light amount of the laser beam used for the exposure of the photosensitive drum 15. For example, the APC circuit 100-1 adjusts a gain of the voltage input from the capacitor C1-1 based on a gain control signal transmitted from the controller 1027 and outputs the voltage.

An output voltage of the APC circuit 100-1 is input to a switch SW 10-1 and an assist circuit 101-1. The assist circuit 101-1 serving as a correction unit is a circuit for correcting delay in a rise of a light amount waveform of the laser light source 1001, and an output voltage of the assist circuit 101-1 is input via a switch SW 11-1 to a constant current source CC1-1 serving as a current supply unit. The switches SW 10-1 and SW 11-1 function as switching units for switching an operation state of the assist circuit 101-1.

The assist circuit 101-1 includes, for example, a differentiating circuit (not illustrated). To the assist circuit 101-1, a high signal or a low signal based on a PWM signal is input from the OR circuit 101. When a high signal is input to the assist circuit 101-1, the differentiating circuit operates. In other words, the differentiating circuit corrects the output voltage of the APC circuit 100-1 so that a current Ioffset is supplied to the LD1 in synchronization with a rise (start of supplying a current Isw) of a current waveform illustrated in FIG. 3C. The differentiating circuit has a time constant, and the voltage input from the APC circuit 100-1 to the differentiating circuit attenuates with time based on the time constant. The time constant is preliminarily set according to how the light amount waveform rises. In addition, the time constant may be dynamically changed according to how the light amount waveform rises. As described above, by operating the assist circuit 101-1, the current Ioffset can be superimposed on the current Isw in synchronization with the start of supplying of the current Isw.

The switches SW 10-1 and SW 11-1 select the output of the APC circuit 100-1 or the output of the assist circuit 101-1 and input either one of the outputs to the constant current source CC1-1. According to the present exemplary embodiment, the switches SW 10-1 and SW 11-1 are each configured as an individual unit. However, as described below, both of the switches SW 10-1 and SW 11-1 are not turned on at the same time. In other words, when one of them is turned on, the other is turned off. Therefore, for example, the switches SW 10-1 and SW 11-1 may be formed as a single switch, in other words, formed as a switch including a contact on the constant current source CC1-1 side as a common contact.

The constant current source CC1-1 generates a current corresponding to the input signal, and the generated current is supplied to the LD1 via the switch SW 13-1 configured with a field-effect transistor (FET). When the switch SW 11-1 is turned on, and the assist circuit 101-1 is connected to the constant current source CC1-1, the current supplied from the constant current source CC1-1 is the current Isw+Ioffset (see FIG. 3C described below). The current value Isw as a first current value (see FIG. 3C described below) is caused by the APC circuit 100-1, and the current value Ioffset is a current value (an assist current value) used for correction by the assist circuit 101-1. The voltage held by the capacitors C2-1 and C3-1 is directly supplied to a bias circuit 102-1 not via a switch. An output of the bias circuit 102-1 serving as a bias current control unit is input to a constant current source CC2-1 serving as a constant current supply unit via a switch SW 12-1. The constant current source CC2-1 generates a current corresponding to the input signal, and the generated current is supplied to the LD1. A current supplied from the constant current source CC2-1 is the bias current Ibias (see FIG. 3C described below) which has a second current value. A power source voltage Vcc is supplied to the constant current sources CC1-1 and CC2-1.

On and off of the above-described switches SW 1 to SW 3 and SW 4-1 to SW 12-1 are controlled by the controller 1027. The switch SW 13-1 is controlled by an output from a logical sum circuit (i.e., the OR circuit 101). To the OR circuit 101, the CONTROL 1 signal output from the controller 1027 and the PWM signal from the PWM signal generation circuit 1032 are input. An output of the OR circuit 101 is input to the assist circuit 101-1 and the switch SW 13-1. The controller 1027 sets the CONTROL 1 signal at a high level to turn on the switch SW 13-1 in the L_APC mode, the M_APC mode, and the H_APC mode. On the other hand, the controller 1027 sets the CONTROL 1 signal at a low level in the OFF mode and the VIDEO mode. Further, in the VIDEO mode, the controller 1027 turns the switch SW 13-1 on or off in response to the PWM signal (see Table 1). The constant current sources CC1-1 and CC2-1, the assist circuit 101-1, the bias circuit 102-1, and the switches SW 10-1 and SW 11-1 are individually provided to each of a plurality of the light emitting elements.

(APC Mode)

Figure 6:
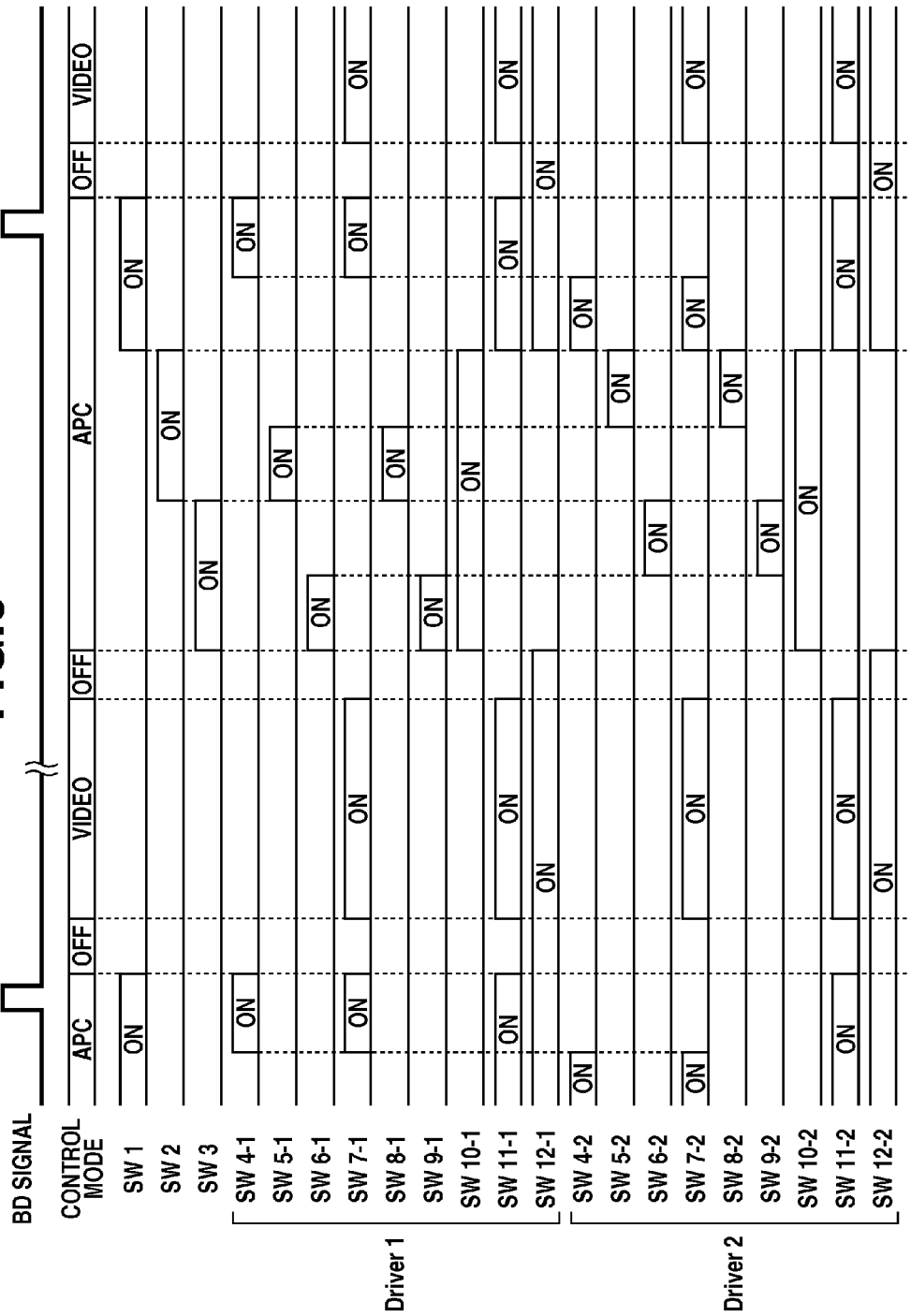
FIG. 6 is a timing chart when various modes are executed in one scanning cycle according to the exemplary embodiment.

Next, various modes executed in one scanning cycle are described with reference to a timing chart illustrated in FIG. 6. In the one scanning cycle, the laser beam emitted from the LD1 in the first light amount control mode enters the BD 1017, and thus a BD signal is generated. From a pulse BDn to a next pulse BDn+1 of the BD signal is regarded as the one scanning cycle. In the one scanning cycle, the laser driver 1029 is shifted as the control mode shown in FIG. 6. Each switch is turned on in a period shown as "ON" and turned off in a period other than the "ON" period in FIG. 6.

(L_APC Mode)

Figure 7:
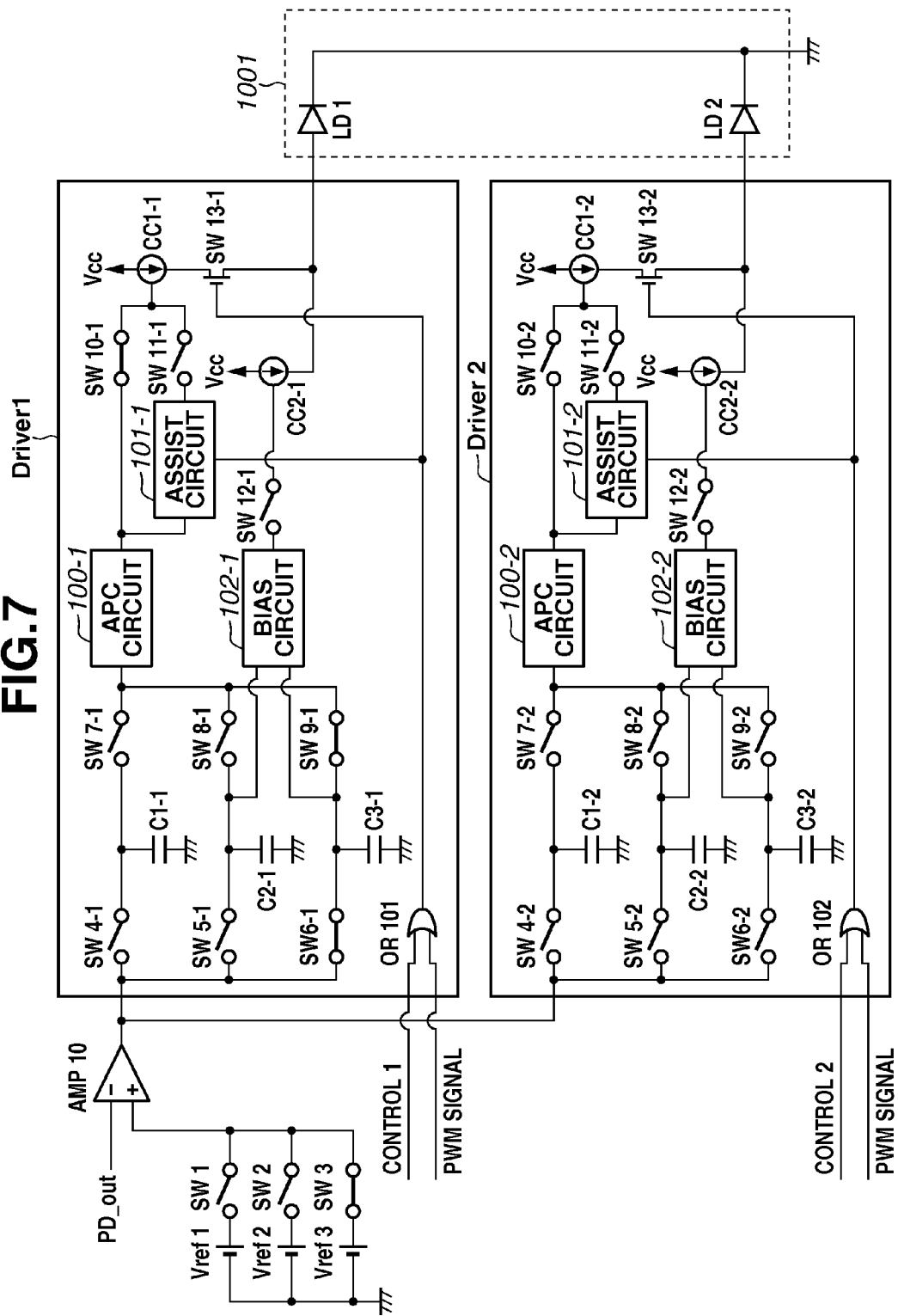
FIG. 7 illustrates a laser drive circuit when an L_APC mode is executed according to the exemplary embodiment.

As illustrated in FIG. 7, the controller 1027 controls the switch SW 3 to turn on in the L_APC mode of the LD1. In addition, the controller 1027 controls the switches SW 6-1, SW 9-1, SW 10-1, and 13-1 to turn on and controls the switches SW 4-1, SW 5-1, SW 7-1, and SW 8-1 to turn off in the Driver 1. When the switches SW 4-1 and SW 5-1 are controlled to be turned off, the sample-and-hold circuit including the capacitor C1-1 and the sample-and-hold circuit including the capacitor C2-1 in the Driver 1 do not sample an output from the AMP 10.

In the L_APC mode of the LD1, the controller 1027 controls switches SW 4-2, SW 5-2, and SW 6-2 in the Driver 2 to turn off. The switches SW 4-2, SW 5-2, and SW 6-2 are thus turned off, the sample-and-hold circuit in the Driver 2 does not sample the output from the AMP 10.

Since the switch SW 3 is turned on, the AMP 10 compares the voltage Vpd input to the negative input terminal with the reference voltage Vref3 input to the positive input terminal. The AMP 10 controls a voltage of the capacitor C3-1 according to a comparison result. Since the switch SW 9-1 is turned on and the switches SW 7-1 and SW 8-1 are turned off, the voltage of the capacitor C3-1 is input to the APC circuit 100-1. In addition, since the switch SW 12-1 is turned off, an output of the bias circuit 102-1 is not input to the constant current source CC2-1. In other words, the bias current Ibias is not included in a current flowing through the LD1 in the L_APC mode.

An output of the APC circuit 100-1 is input to the switch SW 10-1 and the assist circuit 101-1. Since the switch SW 10-1 is turned on, the output of the APC circuit 100-1 is input to the constant current source CC1-1. In addition, since the switch SW 11-1 is turned off, the output of the assist circuit 101-1 is not input to the constant current source CC1-1. In other words, the assist current value for correcting a rise is not included in a current flowing through the LD1 in the L_APC mode. Further, since the switch SW 13-1 is turned on, the constant current source CC1-1 supplies a current corresponding to an input to the LD1 via the switch SW 13-1 to drive the LD1. The laser beam emitted from the LD1 is detected by the PD 1002 via the beam splitter 1010 in FIG. 2. At that time, a negative feedback circuit is formed by the above-described operations, and thus the light amount of the laser beam emitted from the LD1 is controlled to a light amount corresponding to the reference voltage Vref3.

In the L_APC mode of the LD2, operations of the Driver 1 and the Driver 2 are opposite to the above-described operations of the LD1 in the L_APC mode. The operations of the Driver 2 of the LD2 in the L_APC mode are similar to those of the Driver 1 of the LD1 in the L_APC mode, and thus the descriptions thereof are omitted.

(M_APC Mode)

Figure 8:
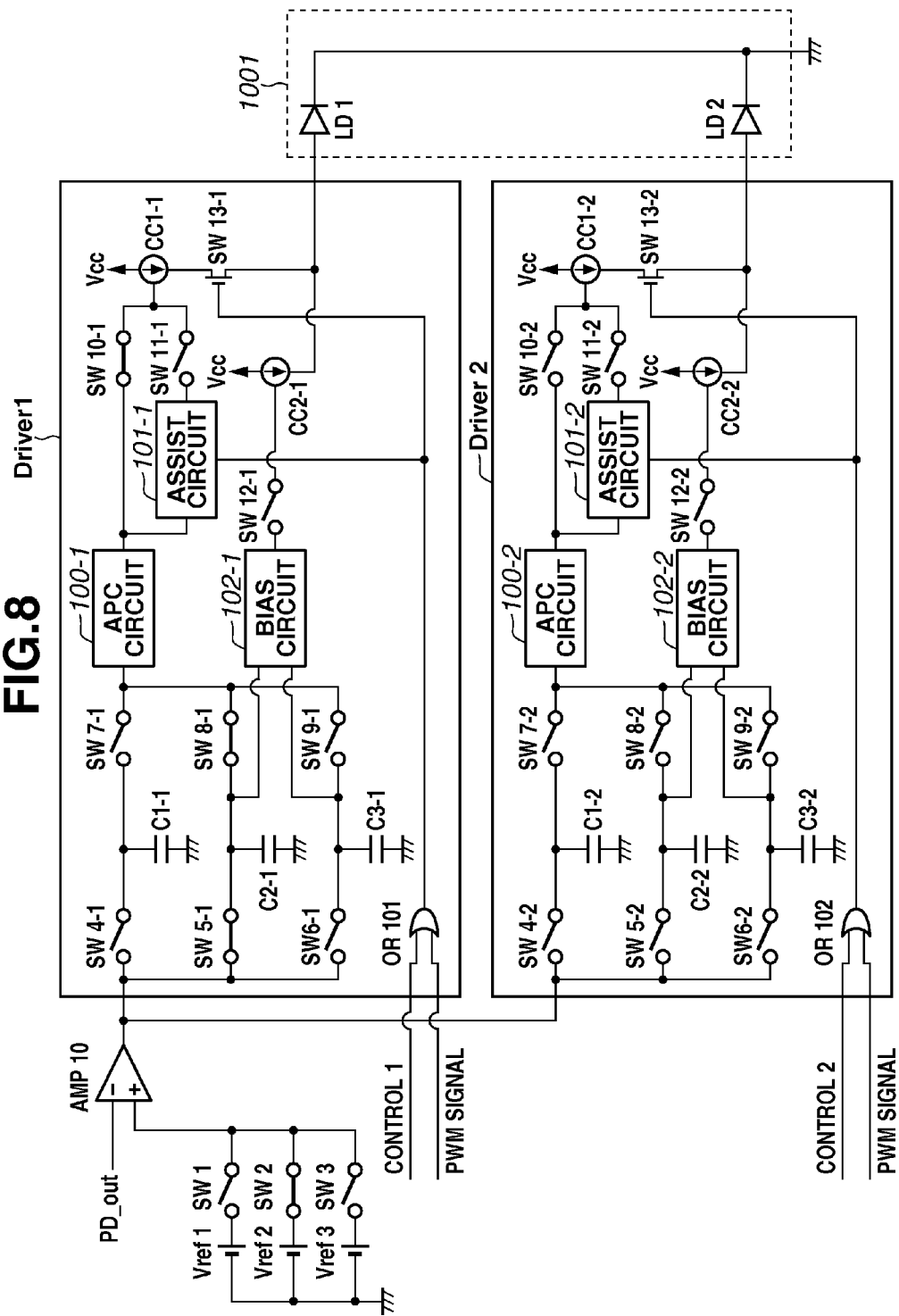
FIG. 8 illustrates a laser drive circuit when an M_APC mode is executed according to the exemplary embodiment.

As illustrated in FIG. 8, the controller 1027 controls the switch SW 2 to turn on in the M_APC mode of the LD1. In addition, the controller 1027 controls the switches SW 5-1, SW 8-1, SW 10-1, and SW 13-1 to turn on and controls the switches SW 4-1, SW 6-1, SW 7-1, and SW 9-1 to turn off in the Driver 1. When the switches SW 4-1 and SW 6-1 are controlled to be turned off, the sample-and-hold circuit including the capacitor C1-1 and the sample-and-hold circuit including the capacitor C3-1 in the Driver 1 do not sample the output from the AMP 10.

In the M_APC mode of the LD1, the controller 1027 controls switches SW 4-2, SW 5-2, and SW 6-2 in the Driver 2 to turn off. The switches SW 4-2, SW 5-2, and SW 6-2 are thus turned off, the sample-and-hold circuit in the Driver 2 does not sample the output from the AMP 10.

Since the switch SW 2 is turned on, the AMP 10 compares the voltage Vpd input to the negative input terminal with the reference voltage Vref2 input to the positive input terminal. The AMP 10 controls a voltage of the capacitor C2-1 according to a comparison result. Since the switch SW 8-1 is turned on and the switches SW 7-1 and SW 9-1 are turned off, the voltage of the capacitor C2-1 is input to the APC circuit 100-1. In addition, since the switch SW 12-1 is turned off, the output of the bias circuit 102-1 is not input to the constant current source CC2-1. In other words, the bias current Ibias is not included in a current flowing through the LD1 in the M_APC mode.

The output of the APC circuit 100-1 is input to the switch SW 10-1 and the assist circuit 101-1. Since the switch SW 10-1 is turned on, the output of the APC circuit 100-1 is input to the constant current source CC1-1. In addition, since the switch SW 11-1 is turned off, the output of the assist circuit 101-1 is not input to the constant current source CC1-1. In other words, the assist current value for correcting a rise is not included in the current flowing through the LD1 in the M_APC mode. Further, since the switch SW 13-1 is turned on, the constant current source CC1-1 supplies a current corresponding to the input to the LD1 via the switch SW 13-1 to drive the LD1. The laser beam emitted from the LD1 is detected by the PD 1002 via the beam splitter 1010 in FIG. 2. At that time, a negative feedback circuit is formed by the above-described operations, and thus the light amount of the laser beam emitted from the LD1 is controlled to a light amount determined by the reference voltage Vref2.

In the M_APC mode of the LD2, operations of the Driver 1 and the Driver 2 are opposite to the above-described operations of the LD1 in the M_APC mode. The operations of the Driver 2 of the LD2 in the M_APC mode are similar to those of the Driver 1 of the LD1 in the M_APC mode, and thus the descriptions thereof are omitted.

(H_APC Mode)

Figure 9:
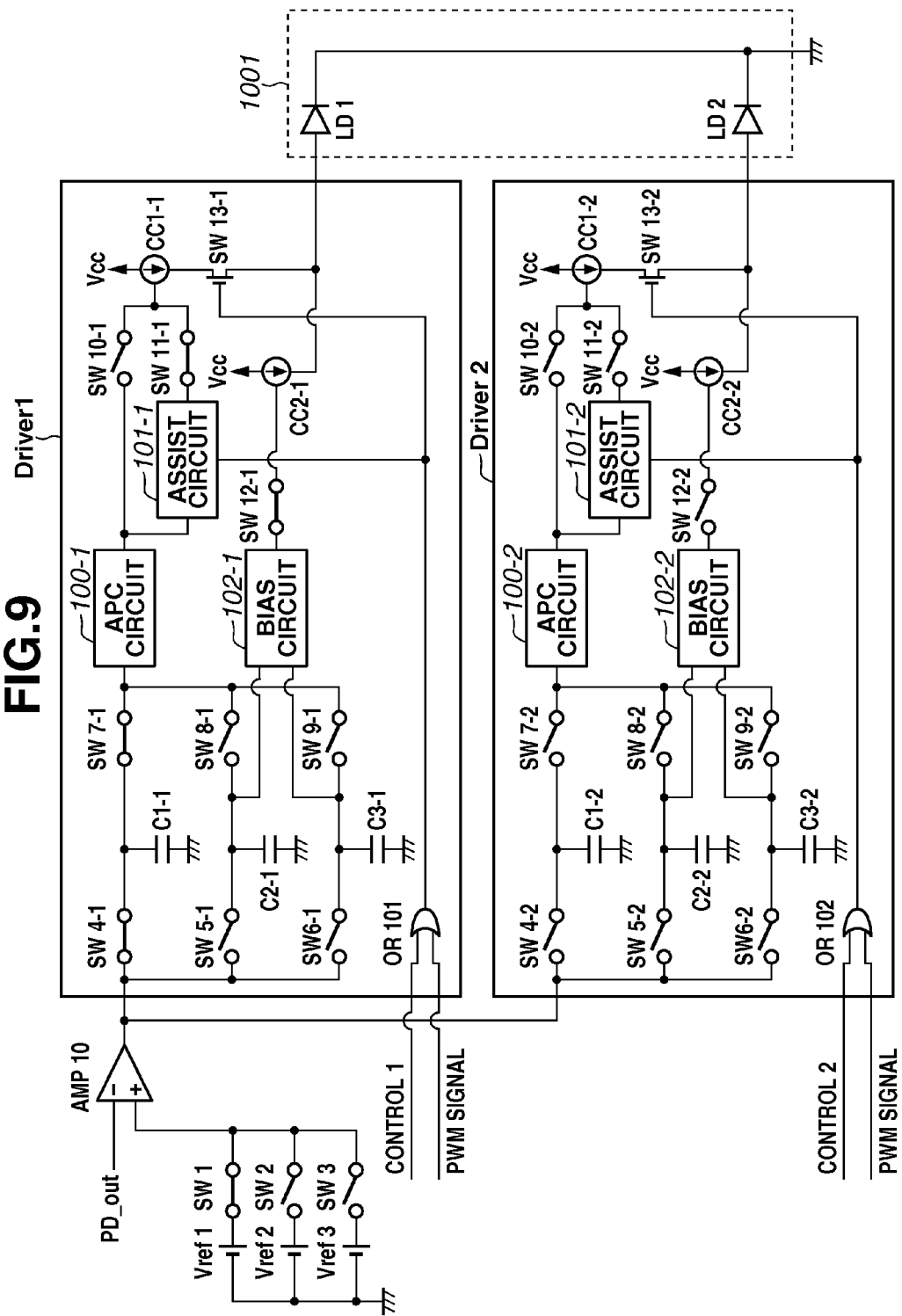
FIG. 9 illustrates a laser drive circuit when an H_APC mode is executed according to the exemplary embodiment.

As illustrated in FIG. 9, the controller 1027 controls the switch SW 1 to turn on in the H_APC mode of the LD1. In addition, the controller 1027 controls the switches SW 4-1, SW 7-1, SW 11-1, SW 12-1, and SW 13-1 to turn on and controls the switches SW 5-1, SW 6-1, SW 8-1, and SW 9-1 to turn off in the Driver 1.

When the switches SW 5-1 and SW 6-1 are controlled to be turned off, the sample-and-hold circuit including the capacitor C2-1 and the sample-and-hold circuit including the capacitor C3-1 in the Driver 1 do not sample the output from the AMP 10. In other words, the above-described capacitor C3-1 holds the output of the AMP in the L_APC mode, and the capacitor C2-1 holds the output of the AMP 10 in the M_APC mode. Voltages of the capacitors C2-1 and C3-1 are output to the bias circuit 102-1. The bias circuit 102-1 outputs a voltage corresponding to the bias current Ibias (see FIG. 3C described below) based on the voltages input from the capacitors C2-1 and C3-1.

Figure 3B:
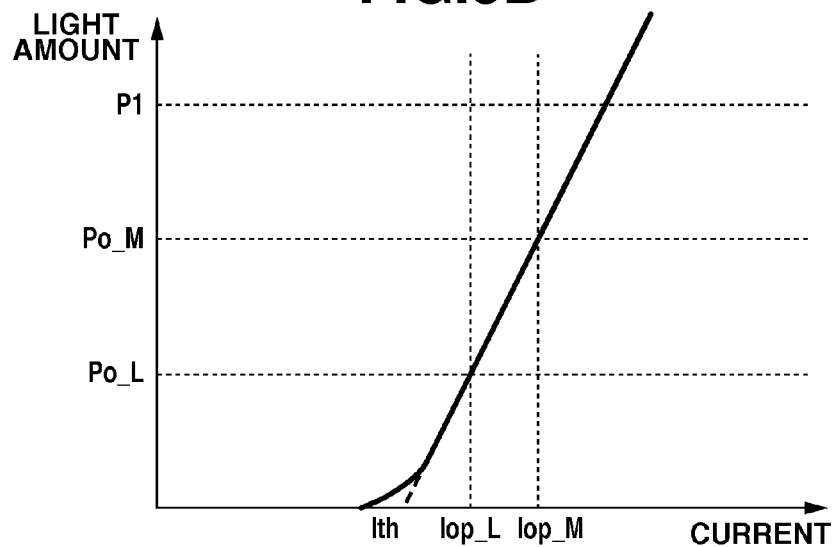

Operations performed by the bias circuit 102-1 to set the bias current Ibias are described with reference to FIG. 3B. FIG. 3B is a graph illustrating an I-L characteristic of the laser light source 1001 in which an abscissa represents a current flowing through the LD1, and an ordinate represents a light amount of the LD1. The light amount of the LD1 in the L_APC mode is defined as a first light amount Po_L, and a current flowing through the LD1 is defined as a third current value Iop_L. Further, the light amount of the LD1 in the M_APC mode is defined as a second light amount Po_M, and a current flowing through the LD1 is defined as a fourth current value Iop_M. In this case, the threshold current value Ith is expressed as follows.

$$(Po\_M*Iop\_L-Po\_L*Iop\_M)/(Po\_M-Po\_L)$$

On the other hand, the light amount Po_M of the LD1 in the M_APC mode is determined by the reference voltage Vref2, and the light amount Po_L of the LD1 in the L_APC mode is determined by the reference voltage Vref3. Further, the currents Iop_M and Iop_L flowing through the LD1 (also they are drive currents) are determined by the voltages of the capacitors C2-1 and C3-1. Thus, the threshold current Ith is expressed by the following formula.

$$(Vref2*C3\text{-}1-Vref3*C2\text{-}1)/(Vref2-Vref3)$$

By calculation using the above-described formulas, the bias circuit 102-1 determines the threshold current value Ith, and the constant current source CC2-1 supplies the bias current Ibias to the LD1 based on the determined threshold current value Ith.

On the other hand, since the switch SW 1 is turned on, the AMP 10 compares the voltage Vpd input to the negative input terminal with the reference voltage Vref1 input to the positive input terminal. The AMP 10 controls a voltage of the capacitor C1-1 according to a comparison result. Since the switch SW 7-1 is turned on, the voltage of the capacitor C1-1 is input to the APC circuit 100-1.

The output of the APC circuit 100-1 is input to the assist circuit 101-1. Since the switch SW 11-1 is turned on, the output of the assist circuit 101-1 is input to the constant current source CC1-1. In other words, a current flowing through the LD1 in the H_APC mode includes not only the bias current Ibias but also the assist current value as a correction value for correcting a delay in a rise of the light amount waveform. Since the switch SW 13-1 is turned on, the constant current source CC1-1 supplies the LD1 with a current corresponding to the input via the switch SW 13-1 to drive the LD1. The laser beam emitted from the LD1 is detected by the PD 1002 via the beam splitter 1010 in FIG. 2. At that time, a negative feedback circuit is formed by the above-described operations, and thus the light amount of the laser beam emitted from the LD1 is controlled to a light amount determined by the reference voltage Vref1. In FIG. 3B, the light amount determined by the reference voltage Vref1 is indicated as P1.

In the H_APC mode of the LD2, operations of the Driver 1 and the Driver 2 are opposite to the above-described operations of the LD1 in the H_APC mode. The operations of the Driver 2 of the LD2 in the H_APC mode are similar to those of the Driver 1 of the LD1 in the H_APC mode, and thus the descriptions thereof are omitted.

(OFF Mode)

Figure 10:
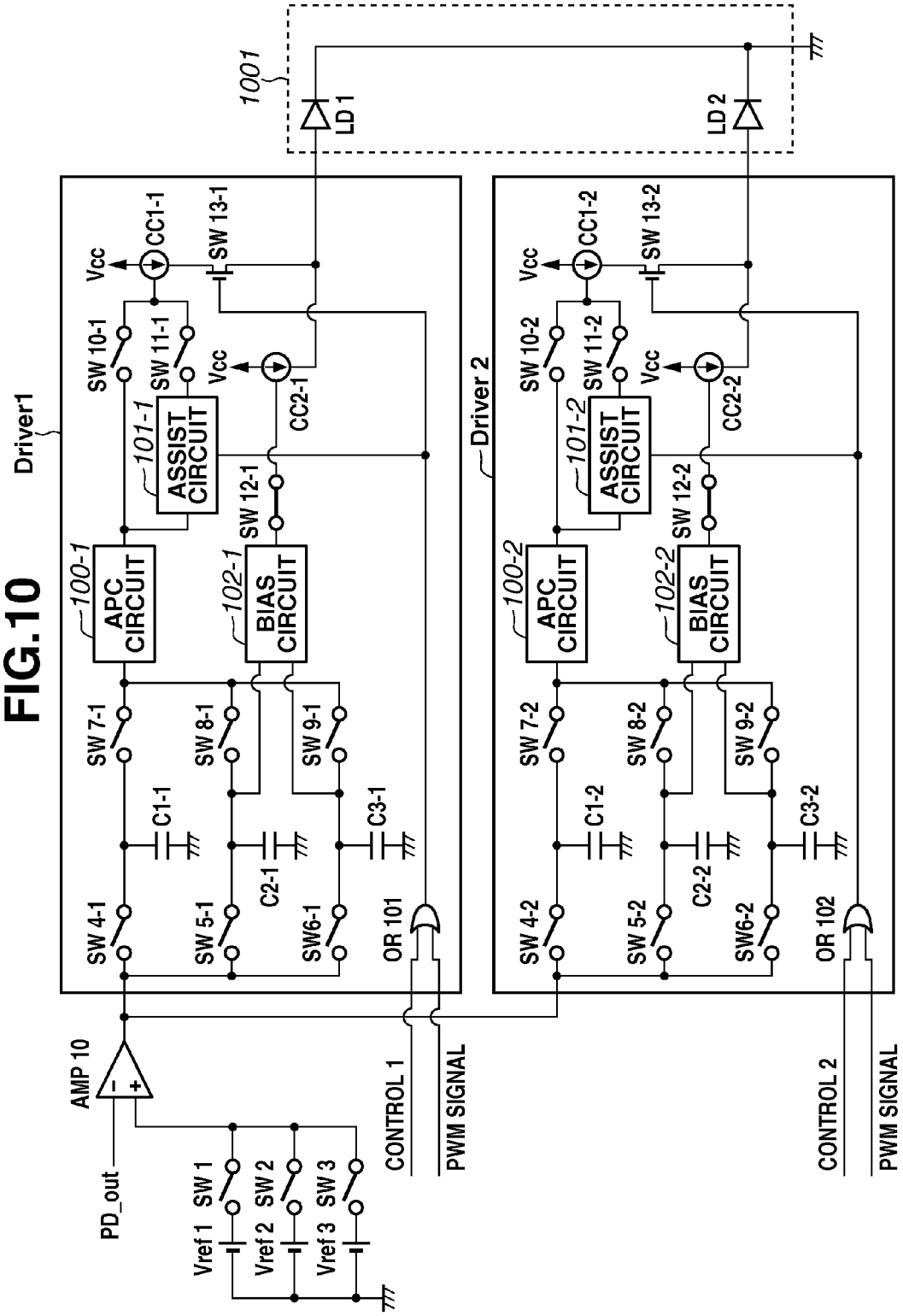
FIG. 10 illustrates a laser drive circuit when an OFF mode is executed according to the exemplary embodiment.

As illustrated in FIG. 10, the controller 1027 controls the switch SW 12-1 to turn on and controls other switches to turn off in the OFF mode. Since the switches SW 4-1, SW 5-1, and SW 6-1 are turned off, the voltages of the capacitors C1-1, C2-1, and C3-1 are maintained. In addition, since the switch SW 13-1 is turned off, an output of the constant current source CC1-1 is not supplied to the LD1. Since the switch SW 12-1 is turned on, the bias current Ibias is supplied from the constant current source CC2-1 to the LD1 based on the threshold current value Ith determined by the bias circuit 102-1. Thus, only the bias current Ibias is supplied to the LD1, and the LD1 comes into a state in which the LD1 minutely emits light. The bias circuit 102-1 is supplied with the voltage held by the capacitors C2-1 and C3-1. The operations of the Driver 2 in the OFF mode are similar to those of the Driver 1, and thus the descriptions thereof are omitted.

(VIDEO Mode)

Figure 11:
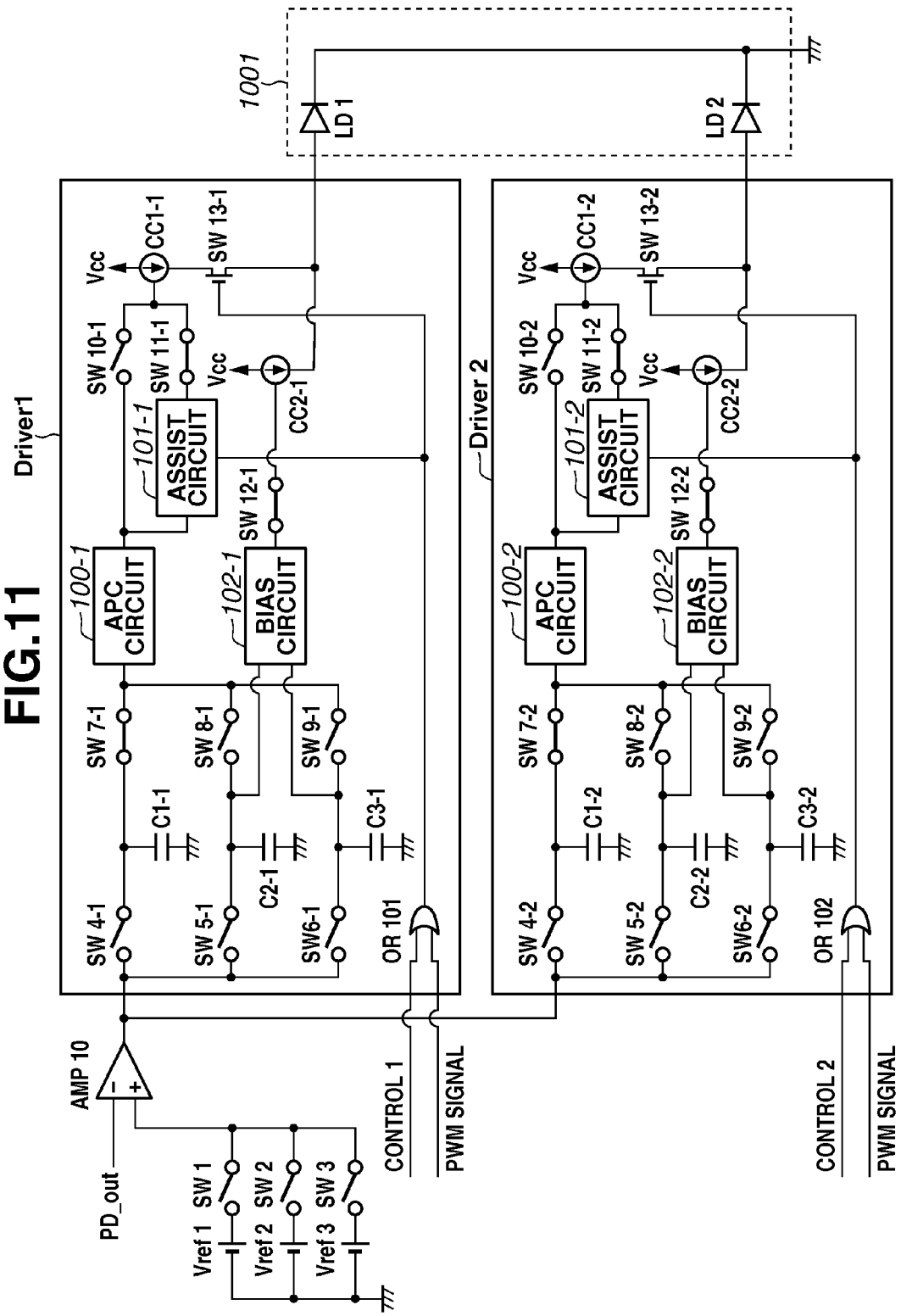
FIG. 11 illustrates a laser drive circuit when a VIDEO mode is executed according to the exemplary embodiment.

As illustrated in FIG. 11, the controller 1027 controls the switches SW 7-1, SW 11-1, and SW 12-1 to turn on in the VIDEO mode. In addition, the controller 1027 controls the switches SW 4-1, SW 5-1, SW 6-1, SW 8-1, SW 9-1, and SW 10-1 to turn off in the VIDEO mode.

In the VIDEO mode, the switches SW 4-1, SW 5-1, and SW 6-1 are turned off, so that the sample-and-hold circuit does not sample the output from the AMP 10. In other words, the capacitor C3-1 holds the output of the AMP 10 in the L_APC mode. The capacitor C2-1 holds the output of the AMP 10 in the M_APC mode. The capacitor C1-1 holds the output of the AMP 10 in the H_APC mode. Therefore, in the VIDEO mode, the voltages of the capacitors C1-1, C2-1, and C3-1 do not vary due to a factor other than self-discharge.

When the switch SW 7-1 is turned on, and the switches SW 8-1 and SW 9-1 are turned off, the voltage of the capacitor C1-1 is input to the APC circuit 100-1. Thus, the APC circuit 100-1 operates corresponding to the voltage of the capacitor C1-1. In the VIDEO mode, since the switch SW 11-1 is turned on, and the switch SW 10-1 is turned off, the output of the APC circuit 100-1 is input to the constant current source CC1-1 via the assist circuit 101-1. The constant current source CC1-1 outputs a switching current Isw having a value corresponding to an input signal from the assist circuit 101-1.

Figure 3C:
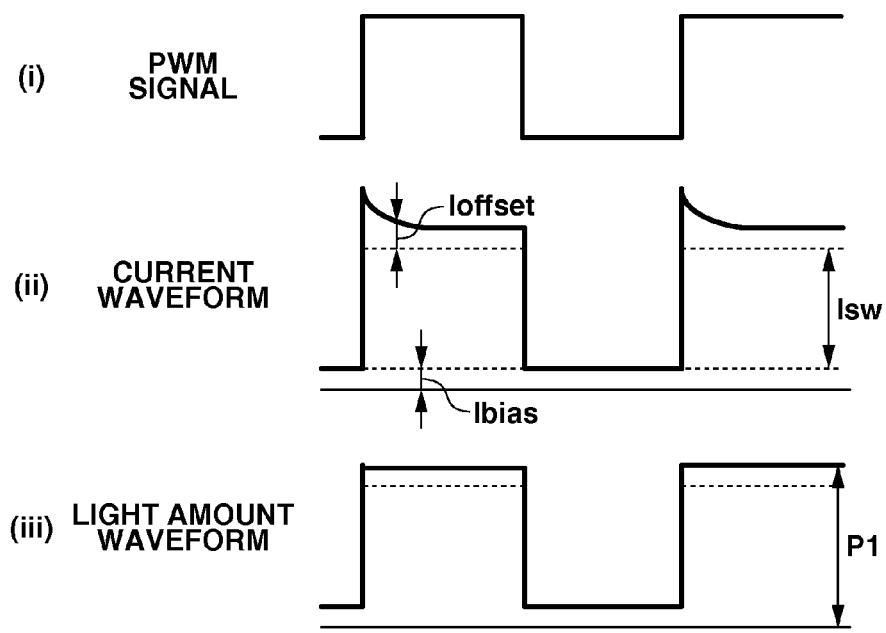

The switch SW 13-1 is controlled by the PWM signal via the OR circuit 101. Operations to correct a delay of the rise time in the light amount waveform of the LD1 in the VIDEO mode are described with reference to FIG. 3C. FIG. 3C(i) illustrates a waveform of the PWM signal, and FIG. 3C(ii) illustrates a waveform of a current supplied to the LD1 (hereinbelow, referred to as a current waveform). FIG. 3C(iii) illustrates a light amount waveform of the light emitted from the LD1. Abscissas in these drawings represent time. When the PWM signal is at the high level, the switch SW 13-1 is turned on, and when the PWM signal is at the low level, the switch SW 13-1 is turned off. "Ioffset" in FIG. 3B is a current obtained by correcting the delay of the rise time in the light amount waveform by the assist circuit 101-1 and is different from an offset by weak exposure.

First, when the input PWM signal is at the low level and the switch SW 13-1 is turned off, the switch SW 12-1 is turned on as with the case of the OFF mode, and thus an output of the constant current source CC2-1 is supplied to the LD1. Thus, as illustrated in FIG. 3C(ii), the LD1 is supplied with the bias current Ibias.

On the other hand, when the PWM signal is at the high level and the switch SW 13-1 is turned on, the following operations are performed. Since the switch SW 7-1 is turned on, the voltage held by the capacitor C1-1 is output to the APC circuit 100-1. In addition, the output of the APC circuit 100-1 is input to the assist circuit 101-1. To the assist circuit 101-1, the PWM signal is also input via the OR circuit 101. Thus, the assist circuit 101-1 supplies the control signal to the constant current source CC1-1 via the switch SW 11-1 so as to make the current value larger than the current value determined by the capacitor C1-1. Accordingly, as illustrated in FIG. 3C(ii), a rise of the current waveform of the LD1 becomes large by the large current supplied from the constant current source CC1-1 via the switch SW 13-1. In addition, the rise time of the light amount waveform of the LD1 is corrected as illustrated in FIG. 3C(iii).

After the light amount waveform rises, the assist circuit 101-1 controls the output of the constant current source CC1-1 so that the light amount of the LD1 becomes the light amount determined by the reference voltage Vref1. At that time, an offset voltage added by the assist circuit 101-1 is superimposed on the output of the assist circuit 101-1, and an offset current Ioffset is also superimposed on the output of the constant current source CC1-1. In other words, a solid line of the current waveform in FIG. 3C(ii) indicates a value of Ibias+Isw+Ioffset. However, the APC is also executed by the output of the assist circuit 101-1 in the H_APC mode, the voltage of the capacitor C1-1 is maintained to make the light amount to be a light amount (P1) determined by the reference voltage Vref1 including the offset current Ioffset. Thus, the LD1 is driven at the light amount determined by the reference voltage Vref1 by the PWM signal. The operations of the Driver 2 in the VIDEO mode are similar to those of the Driver 1, and thus the descriptions thereof are omitted.

[Print Sequence]

Figure 12:
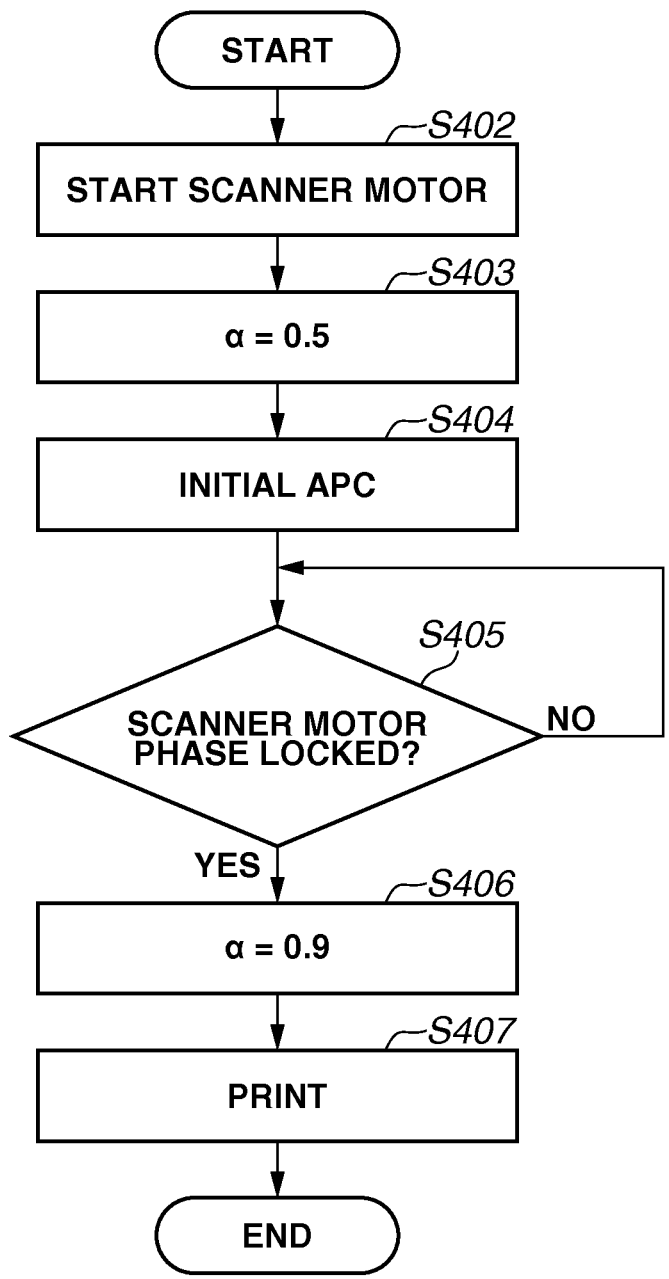
FIG. 12 illustrates a print sequence of the exposure apparatus according to the exemplary embodiment.

Next, a print sequence according to the present exemplary embodiment is described with reference to FIG. 12. When receiving a job, the controller 1027 starts the following print sequence according to a program stored in a read-only memory (ROM) using a random access memory (RAM) as a temporary storage area, which are not illustrated. In step S402, the controller 1027 outputs a control signal to the scanner motor 1003 to cause the scanner motor 1003 to start rotation. In step S403, the controller 1027 sets a first coefficient $\alpha1=0.5$ to the bias coefficient $\alpha$ for calculating the bias current value Ib from the threshold current value Ith. The bias coefficient $\alpha$ in this case is determined to the coefficient $\alpha1$ (Ith>$\alpha1$*Ibmax) which is sufficiently lower than the threshold current value Ith with respect to a maximum value Ibmax of the bias current that the bias circuit 102-1 can supply. Thus, the bias current Ib is set to a value which is not larger than the threshold current value at the maximum.

In step S404, the controller 1027 executes initial APC. The initial APC is the APC executed until the scanner motor 1003 reaches a target number of rotations in step S405 described below. The controller 1027 performs the operations in the H_APC mode, in the M_APC mode, and in the L_APC mode to charge each of the capacitors C1-1, C2-1, and C3-1 to an initial voltage. In other words, charging is started from a state that the capacitors C1-1, C2-1, and C3-1 do not hold charges. If the bias coefficient α is set to a sufficiently low value when these operations are performed, the bias current Ib becomes sufficiently lower than the threshold current value Ith, and the light amount Poffset due to the minute light emission is made sufficiently small, so that a malfunction of the dark current cancelling circuit 500 can be prevented. In other words, the initial APC can be said as the APC to be executed by setting the bias coefficient α to a sufficiently low value.

In step S405, the controller 1027 determines whether a phase of the scanner motor 1003 is locked by phase control, in other words, whether the scanner motor 1003 reaches the target number of rotations. The controller 1027 counts, for example, a period of the BD signal and detects the number of rotations of the scanner motor 1003 based on the counted period. Thus, the controller 1027 determines whether the scanner motor 1003 reaches the target number of rotations. As described above, the controller 1027 also functions as a rotation number detection unit for detecting the number of rotations of the scanner motor 1003.

In step S405, when the controller 1027 determines that the phase of the scanner motor 1003 is not locked (NO in step S405), the processing in step S405 is repeated, and when the controller 1027 determines that the phase of the scanner motor 1003 is locked (YES in step S405), the processing proceeds to step S406. In step S406, the controller 1027 set a second coefficient α2=0.9 to the bias coefficient α. In step S407, the controller 1027 performs image formation (a print operation). In this regard, until the bias coefficient α is set to 0.9, the initial APC is continued in the state in which the bias coefficient α is set to 0.5. Further, during the print operation, the processing in FIG. 4 is executed while setting the bias coefficient α to 0.9. Since the minute light emission is performed at the threshold current value Ith, the bias coefficient α in step S406 is determined to a value which makes a current value maximum at which laser emission is not performed. Accordingly, an optimum latent image can be formed in the image formation.

As described above, according to the present exemplary embodiment, before the image formation operation until the number of rotations of the scanner motor 1003, namely the rotating polygon mirror 1012, reaches the target number of rotations, the bias coefficient α is set to 0.5, and the bias current value is set to a first predetermined value (=0.5*Ith). Then, in the image formation operation after a predetermined timing that the number of rotations of the rotating polygon mirror 1012 reaches the target number of rotations, the bias coefficient α is set to 0.9, and the bias current value is set to a second predetermined value (=0.9*Ith) which is larger than the first predetermined value. Thus, according to the present exemplary embodiment, the effect of the dark current cancelling circuit 500 on obtaining of the threshold current value Ith can be reduced.

As described above, according to the present exemplary embodiment, the setting accuracy of the bias current value can be prevented from deteriorating.

According to the present invention, the setting accuracy of the bias current value can be prevented from deteriorating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-102482, filed May 16, 2014, which is hereby incorporated by reference herein in its entirety.

What is claimed is:

1. An image forming apparatus comprising:
a light source including a light emitting element which emits a light beam for forming an electrostatic latent image on a photosensitive member;
a rotating polygon mirror configured to be rotationally driven and to deflect a light beam emitted from the light source to scan the photosensitive member;
a light receiving element for receiving a light beam emitted from the light emitting element;
a current supply unit configured to supply a current to the light emitting element, wherein the current supply unit supplies the light emitting element with a bias current regardless of image data and supplies the light emitting element with a switching current to be superimposed on the bias current based on the image data for a time period in which at least the light beam scans the photosensitive member;
a removal unit configured to remove a dark current component from a light receiving result of the light receiving element, wherein the dark current component is output from the light receiving element in a state in which the switching current is not supplied from the current supply unit to the light emitting element;
an output unit configured to output a first comparison voltage corresponding to a first target light amount and a second comparison voltage corresponding to a second light amount larger than the first target light amount;
a charging/discharging unit including a first capacitor and a second capacitor and configured to charge or discharge the first capacitor based on a comparison result of a voltage obtained by removing the dark current component from an output of the light receiving element which receives the light beam with the first comparison voltage and to charge or discharge the second capacitor based on a comparison result of a voltage obtained by removing the dark current component from an output of the light receiving element which receives the light beam with the second comparison voltage; and
a bias current control unit configured to calculate a threshold current value based on voltage values of the first capacitor and the second capacitor and to set a value obtained by multiplying the threshold current value by a correction coefficient equal to or less than one to a value of the bias current,
wherein the bias current control unit sets a value of the bias current using a first correction coefficient as the correction coefficient for a predetermined time period from when a state in which the first capacitor and the second capacitor are not charged, then changes the correction coefficient to a second correction coefficient larger than the first correction coefficient, and sets a value of a bias current obtained by using the second correction coefficient, and
wherein the current supply unit supplies the light emitting element with a bias current obtained by using the second correction coefficient and the switching current, and thus the electrostatic latent image is formed.

2. The image forming apparatus according to claim 1, wherein a timing when the bias current control unit changes the first correction coefficient to the second correction coefficient is before an image formation operation based on the image data.

3. The image forming apparatus according to claim 2, wherein a timing when the bias current control unit changes the first correction coefficient to the second correction coefficient is a timing when the rotating polygon mirror reaches a target number of rotations, and
wherein the image formation operation is started after the timing when the rotating polygon mirror reaches the target number of rotations.

4. The image forming apparatus according to claim 3, further comprising:
a detection unit configured to detect a light beam deflected by the rotating polygon mirror,
wherein the bias current control unit determines whether the rotating polygon mirror reaches the target number of rotations based on a detection result of the detection unit.

5. The image forming apparatus according to claim 1, further comprising:
a switching current control unit configured to control a value of the switching current supplied to the light emitting element by the current supply unit based on a light receiving result of the light receiving element which receives a light beam emitted, from the light emitting element, by being supplied with a current,
wherein the output unit outputs a third comparison voltage corresponding to a third target light amount which is equal to or larger than the second target light amount,
wherein the charging/discharging unit further comprises a third capacitor and charges or discharges the third capacitor based on a comparison result of a voltage obtained by removing the dark current component from an output of the light receiving element which receives the light beam with the third comparison voltage, and
wherein the switching current control unit controls a value of the switching current based on a voltage of the third capacitor.

6. The image forming apparatus according to claim 1, further comprising:
a correction unit configured to correct a value of a current supplied from the current supply unit to the light emitting element to correct a light amount of a light beam emitted from the light emitting element; and
a switching unit configured to switch an operation state of the correction unit with respect to a current supplied to the light emitting element, when the switching current is supplied in a time period in which at least the light beam scans the photosensitive member, so that a value of a current supplied from the current supply unit to the light emitting element is corrected by the correction unit and a value of a current that the current supply unit is supplied from the light emitting element to enter a light beam to the light receiving element so as to control a value of the bias current is not corrected by the correction unit.

7. The image forming apparatus according to claim 6, wherein, in a case where the light beam is entered into the light receiving element so as to control a value of the bias current, the switching unit causes the correction unit not to act on the bias current.

8. The image forming apparatus according to claim 7, wherein, in a case where the light beam is entered into the light receiving element so as to control a value of the switching current, the switching unit causes the correction unit to correct a value of the switching current.

9. The image forming apparatus according to claim 6, wherein the correction unit acts on a current supplied to the light emitting element so as to correct a rise of a light amount waveform of a light beam emitted from the light emitting element.

10. The image forming apparatus according to claim 6, wherein the light source is a surface emitting laser including a plurality of the light emitting elements, and
wherein the current supply unit, the correction unit, the charging/discharging unit, and the bias current control unit are individually provided to each of the plurality of the light emitting elements.

11. The image forming apparatus according to claim 1, further comprising:
a beam splitter disposed between the light source and the rotating polygon mirror on a light path of a light beam emitted from the light source and configured to separate a light beam emitted from the light source to a light beam travelling to the rotating polygon mirror and a light beam travelling to the light receiving element,
wherein the light receiving element receives a light beam separated by the beam splitter.

12. The image forming apparatus according to claim 1, wherein the light source is a surface emitting laser including a plurality of the light emitting elements, and
wherein the current supply unit, the charging/discharging unit, and the bias current control unit are individually provided to each of the plurality of the light emitting elements.

13. The image forming apparatus according to claim 1, further comprising:
the photosensitive member;
a development unit configured to develop an electrostatic latent image formed on the photosensitive member with a toner; and
a transfer unit configured to transfer a toner image developed by the development unit to a recording medium.

* * * * *